United States Patent
Yamamoto et al.

(10) Patent No.: US 9,274,255 B2
(45) Date of Patent: Mar. 1, 2016

(54) LIGHT-DIFFUSION MEMBER, MANUFACTURING METHOD THEREOF, AND DISPLAY DEVICE

(75) Inventors: Emi Yamamoto, Osaka (JP); Toru Kanno, Osaka (JP); Hidefumi Yoshida, Osaka (JP); Tsuyoshi Maeda, Osaka (JP); Tsuyoshi Kamada, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 97 days.

(21) Appl. No.: 13/880,181

(22) PCT Filed: Oct. 18, 2011

(86) PCT No.: PCT/JP2011/073897
§ 371 (c)(1),
(2), (4) Date: May 23, 2013

(87) PCT Pub. No.: WO2012/053501
PCT Pub. Date: Apr. 26, 2012

(65) Prior Publication Data
US 2014/0160410 A1  Jun. 12, 2014

(30) Foreign Application Priority Data

Oct. 21, 2010  (JP) .................................. 2010-236513

(51) Int. Cl.
*G02F 1/1335* (2006.01)
*G02B 5/02* (2006.01)
(Continued)

(52) U.S. Cl.
CPC ........ *G02B 5/0268* (2013.01); *B29D 11/00798* (2013.01); *G02B 5/021* (2013.01);
(Continued)

(58) Field of Classification Search
CPC   G02F 1/133504; G02B 5/0231; G02B 5/021; G02B 5/0211; G02B 5/0268
See application file for complete search history.

(56) References Cited

U.S. PATENT DOCUMENTS 6,002,464 A * 12/1999 Fujisawa et al. .............. 349/112
6,417,966 B1 * 7/2002 Moshrefzadeh et al. ..... 359/453
(Continued)

FOREIGN PATENT DOCUMENTS

JP  2003-504691 A  2/2003
JP  2004-516525 A  6/2004
(Continued)

OTHER PUBLICATIONS

Official Communication issued in International Patent Application No. PCT/JP2011/073897, mailed on Nov. 22, 2011.

*Primary Examiner* — Richard Kim
*Assistant Examiner* — Kendrick Hsu
(74) *Attorney, Agent, or Firm* — Keating & Bennett, LLP

(57) ABSTRACT

A light-diffusion member includes a substrate having light transparency, a plurality of light-diffusion parts formed on one surface of the substrate, and a light-absorbing layer formed in a region other than a region where the light-diffusion parts are formed, among the one surface of the substrate. Each light-diffusion part includes a light-emission end surface on the side of the substrate and a light-incident end surface of an area larger than an area of the light-emission end surface on a side opposite to the side of the substrate. The height from the light-incident end surface of the light-diffusion part to the light-emission end surface thereof is larger than the thickness of the light-absorbing layer. The plurality of light-diffusion parts are randomly arranged on the one surface of the substrate.

6 Claims, 22 Drawing Sheets

(51) Int. Cl.
*B29D 11/00* (2006.01)
*G06F 3/041* (2006.01)
*G02F 1/1333* (2006.01)

(52) U.S. Cl.
CPC ........... *G02B 5/0221* (2013.01); *G02B 5/0231* (2013.01); *G02F 1/133504* (2013.01); *G06F 3/0412* (2013.01); *G02F 1/13338* (2013.01)

(56) References Cited

U.S. PATENT DOCUMENTS

| | | | |
|---|---|---|---|
| 7,948,565 B2 * | 5/2011 | Ha et al. | 349/12 |
| 2005/0128579 A1 * | 6/2005 | Thomas et al. | 359/443 |
| 2010/0309411 A1 * | 12/2010 | Shibata et al. | 349/64 |
| 2011/0019128 A1 * | 1/2011 | Takata | 349/62 |

FOREIGN PATENT DOCUMENTS

| | | |
|---|---|---|
| JP | 2004-361685 A | 12/2004 |
| JP | 2007-514202 A | 5/2007 |
| JP | 2007-517929 A | 7/2007 |
| JP | 2007-519034 A | 7/2007 |
| JP | 2010-079292 A | 4/2010 |
| WO | 01/04701 A1 | 1/2001 |
| WO | 02/052341 A1 | 7/2002 |
| WO | 2005/062081 A1 | 7/2005 |
| WO | 2005/062117 A1 | 7/2005 |
| WO | 2005/062118 A1 | 7/2005 |
| WO | WO2009118946 A1 * | 10/2009 |

* cited by examiner

FIG. 7A
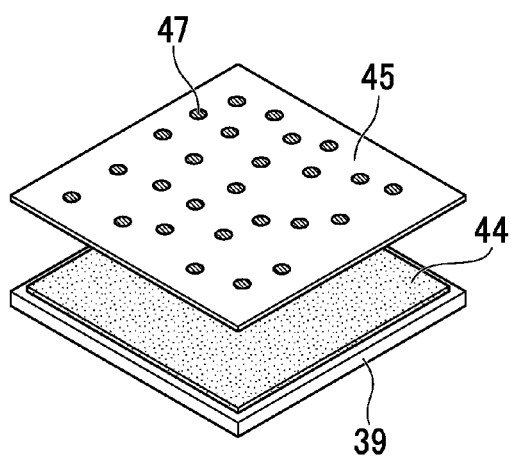
FIG. 7B
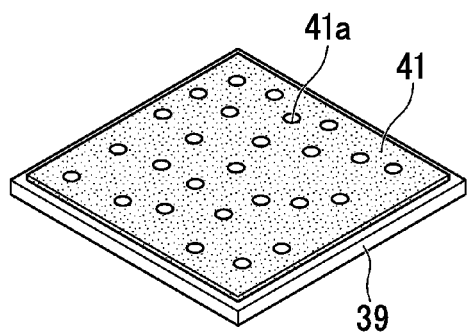
FIG. 7C
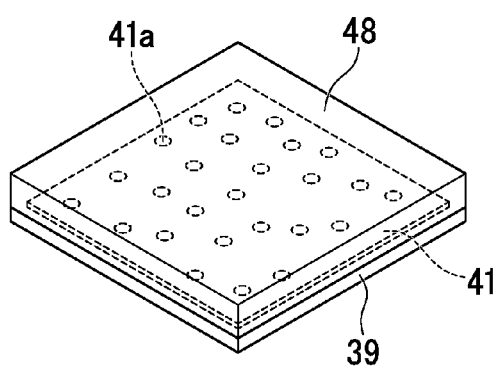
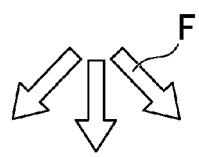
FIG. 7D
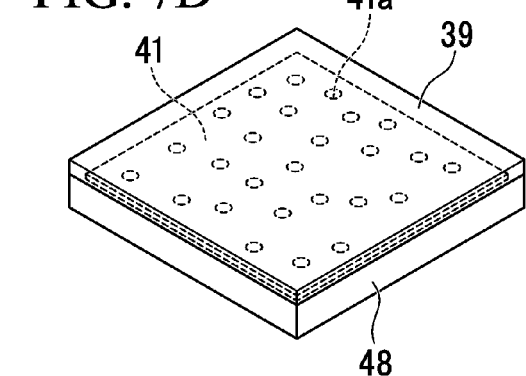
FIG. 7E

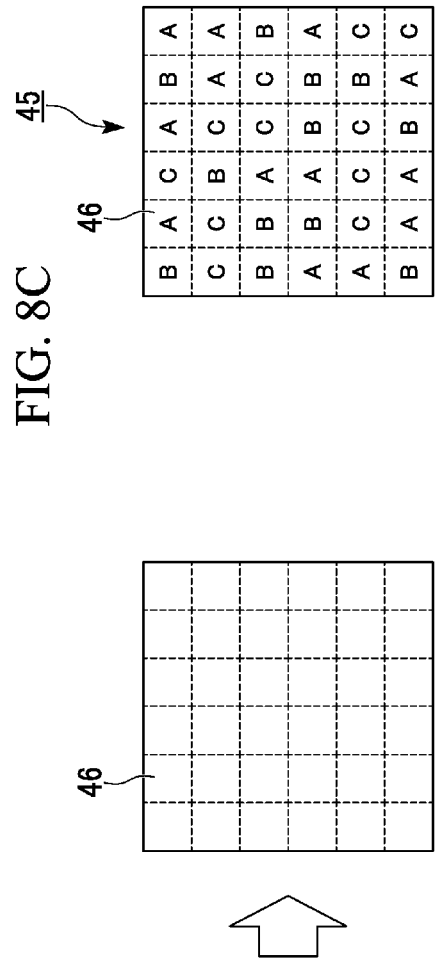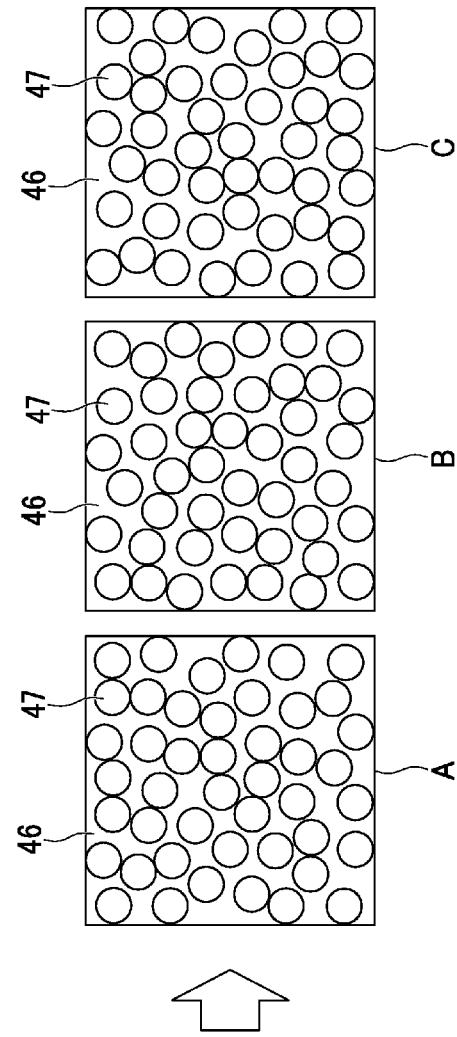

LIGHT-DIFFUSION MEMBER, MANUFACTURING METHOD THEREOF, AND DISPLAY DEVICE

TECHNICAL FIELD

The present invention relates to a light-diffusion member, a manufacturing method thereof, and a display device.

Priority is claimed on Japanese Patent Application No. 2010-236513, filed Oct. 21, 2010, the content of which is incorporated herein by reference in its entirety.

BACKGROUND ART

As a display of a portable electronic device such as a mobile phone, a TV, a personal computer or the like, a liquid crystal display device has been widely used. However, it is generally known in the related art that the liquid crystal display device that is excellent in visibility from a front side but is narrow in a view angle, and thus, various efforts have been made to widen the view angle. As an example, a configuration may be proposed in which a member for diffusing light emitted from a display body such as a liquid crystal panel (hereinafter, referred to as a light-diffusion member) is provided on a visible side of the display body.

For example, Patent Document 1 discloses a light-dispersion film that forms a part of a rear projection screen. The light-dispersion film includes a light transmitting substrate, and a plurality of light-diffusion structures arranged on the light transmitting substrate. The light-dispersion film has a configuration in which the plurality of light-diffusion structures includes a plurality of resin structures and a light-absorbing adhesive is filled in a part of cavities between the light-diffusion structures.

CITATION LIST

Patent Document

Patent Document 1: JP-T-2007-514202

SUMMARY OF INVENTION

Technical Problem

The light-dispersion film disclosed in Patent Document 1 includes rib-shaped structures in which the plurality of light-diffusion structures extend from one end to another of the light transmitting substrate, or structures having a staggered layout.

That is, the plurality of light-diffusion structures include a plurality of structures that is regularly arranged. Thus, moire due to light interference when an image is displayed occurs, and thus, display quality deteriorates.

According to an aspect of the invention, there is provided a light-diffusion member capable of suppressing moire when an image is displayed and enlarging a view angle, and a manufacturing method thereof. Further, there is provided a display device that includes the light-diffusion member and is excellent in display quality.

Solution to Problem

According to an aspect of the invention, a light-diffusion member includes a substrate having light transparency, a plurality of light-diffusion parts formed on a surface of the substrate, and a light-absorbing layer formed in a region other than a region where the light-diffusion parts are formed, among the surface of the substrate. Each light-diffusion part includes a light-emission end surface on the side of the substrate, and a light-incident end surface having an area larger than an area of the light-emission end surface on a side opposite to the side of the substrate, the height from the light-incident end surface of the light-diffusion part to the light-emission end surface thereof is larger than the thickness of the light-absorbing layer, and the plurality of light-diffusion parts are randomly arranged on the surface of the substrate.

In the light-diffusion member according to the aspect of the invention, air may be present in a gap between the plurality of light-diffusion parts.

In the light-diffusion member according to the aspect of the invention, the size of the light-emission end surface of at least one light-diffusion part among the plurality of light-diffusion parts may be different from the size of the light-emission end surfaces of other light-diffusion parts.

In the light-diffusion member according to the aspect of the invention, an inclination angle of a side surface of at least one light-diffusion part among the plurality of light-diffusion parts may be different from an inclination angle of side surfaces of other light-diffusion parts.

In the light-diffusion member according to the aspect of the invention, an inclination angle of a side surface of at least one light-diffusion part among the plurality of light-diffusion parts may be continuously changed.

In the light-diffusion member according to the aspect of the invention, the planar shape of the light-diffusion part seen in a normal direction of the surface of the substrate may be circular or polygonal.

According to another aspect of the invention, a light-diffusion member includes a substrate having light transparency, a plurality of light-absorbing layers formed to be scattered on a surface of the substrate, and a light-diffusion part formed in a region other than a region where the light-absorbing layers are formed, among the surface of the substrate. Here, the light-diffusion part includes a light-emission end surface on the side of the substrate, and a light-incident end surface having an area larger than the area of the light-emission end surface on a side opposite to the side of the substrate, the height from the light-incident end surface of the light-diffusion part to the light-emission end surface thereof is larger than the thickness of the light-absorbing layer, and the light-diffusion part has a random shape when seen in a normal direction of the surface of the substrate.

In the light-diffusion member according to the aspect of the invention, at least one of an antireflection layer, a polarizing filter layer, an antistatic layer, a non-glare treatment layer, and an antifouling layer may be provided on a surface opposite to the surface of the substrate.

According to still another aspect of the invention, a method of forming a light-diffusion member includes, forming a light-absorbing layer that includes at least an opening portion on a surface of a substrate having light transparency; forming a negative photosensitive resin layer having light transparency to cover the light-absorbing layer on the surface of the substrate; irradiating diffusion light onto the negative photosensitive resin layer through the opening portion of the light-absorbing layer from a surface opposite to the surface of the substrate on which the light absorbing layer and the negative photosensitive resin layer are formed, and developing the negative photosensitive resin layer irradiated with the diffusion light to form, on the one surface of the substrate, a light-diffusion part that includes a light-emission end surface on the side of the substrate and a light-incident end surface having an area larger than an area of the light-emission end surface on a side opposite to the side of the substrate.

According to still another aspect of the invention, a display device includes a display, and a view angle enlarging member that is provided on a visible side of the display and outputs light in a state where angle distribution of light-incident from the display body is wider than before incidence. The view angle enlarging member includes a substrate having light transparency, a plurality of light-diffusion parts formed on a surface of the substrate, and a light-absorbing layer formed in a region other than a region where the light-diffusion parts are formed, among the surface of the substrate. The light-diffusion part includes a light-emission end surface on the side of the substrate, and a light-incident end surface having an area larger than an area of the light-emission end surface on a side opposite to the side of the substrate. The height from the light-incident end surface of the light-diffusion part to the light-emission end surface thereof is larger than the thickness of the light-absorbing layer. The plurality of light-diffusion parts are randomly arranged on the surface of the substrate.

In the display device according to the aspect of the invention, the display may have a plurality of pixels that forms a display image, and an average interval between adjacent light-diffusion parts among the plurality of light-diffusion parts of the light-diffusion member may be smaller than an interval between the pixels of the display.

In the display device according to the aspect of the invention, an information input device may be provided on the visible side of the view angle enlarging member.

In the display device according to the aspect of the invention, the display may include a light source and a light modulation device that modulates light from the light source, and the light source may emit light having directivity.

In the display device according to the aspect of the invention, the display body may be a liquid crystal display element.

Advantageous Effects of Invention

According to the aspects of the invention, it is possible to provide a light-diffusion member capable of suppressing moire when an image is displayed and enlarging a view angle, and a manufacturing method thereof. Further, according to the aspects of the invention, it is possible to provide a display device that includes the light-diffusion member and is excellent in display quality.

BRIEF DESCRIPTION OF DRAWINGS

FIG. 7A is a perspective view illustrating the process of forming the view angle enlarging film in the liquid crystal display device according to the first embodiment of the invention.

FIG. 7B is a perspective view illustrating the process of forming the view angle enlarging film in the liquid crystal display device according to the first embodiment of the invention.

FIG. 7C is a perspective view illustrating the process of forming the view angle enlarging film in the liquid crystal display device according to the first embodiment of the invention.

FIG. 7D is a perspective view illustrating the process of forming the view angle enlarging film in the liquid crystal display device according to the first embodiment of the invention.

FIG. 7E is a perspective view illustrating the process of forming the view angle enlarging film in the liquid crystal display device according to the first embodiment of the invention.

FIG. 8A is a diagram illustrating arrangement of the light-diffusion part of the view angle enlarging film in the liquid crystal display device according to the first embodiment of the invention.

FIG. 8B is a diagram illustrating arrangement of the light-diffusion part of the view angle enlarging film in the liquid crystal display device according to the first embodiment of the invention.

FIG. 8C is a diagram illustrating arrangement of the light-diffusion part of the view angle enlarging film in the liquid crystal display device according to the first embodiment of the invention.

DESCRIPTION OF EMBODIMENTS

First Embodiment

Hereinafter, a first embodiment of the invention will be described referring to FIGS. 1A to 12B.

In the present embodiment, a liquid crystal display device that includes a transmissive liquid crystal panel will be described as an example of a display body.

In the following drawings, to facilitate understanding of components, illustrations of some components are partially enlarged and shown.

Figure 1A:
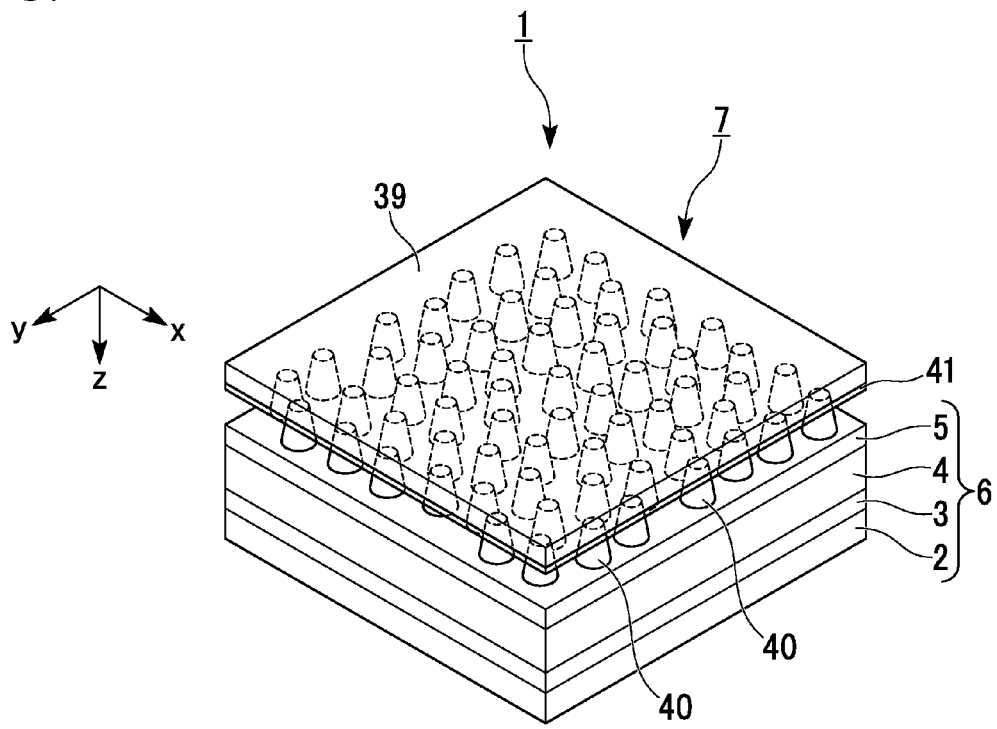
FIG. 1A is a perspective view illustrating a liquid crystal display device according to a first embodiment of the invention.
Figure 1B:
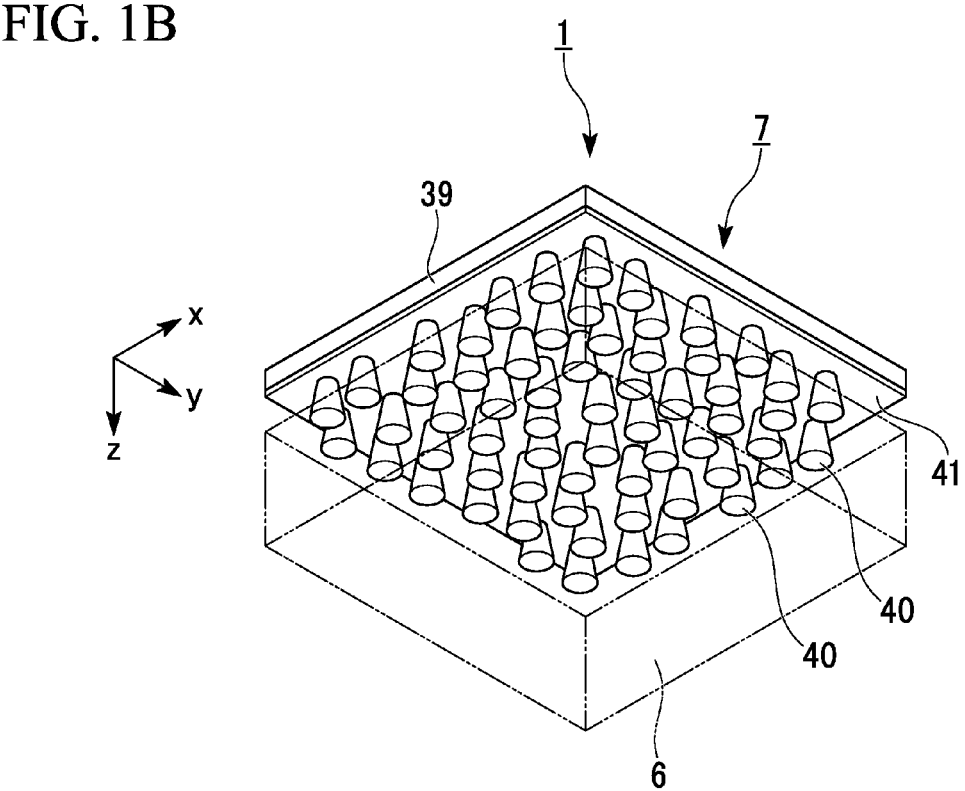
FIG. 1B is a perspective view illustrating the liquid crystal display device according to the first embodiment of the invention.
Figure 2:
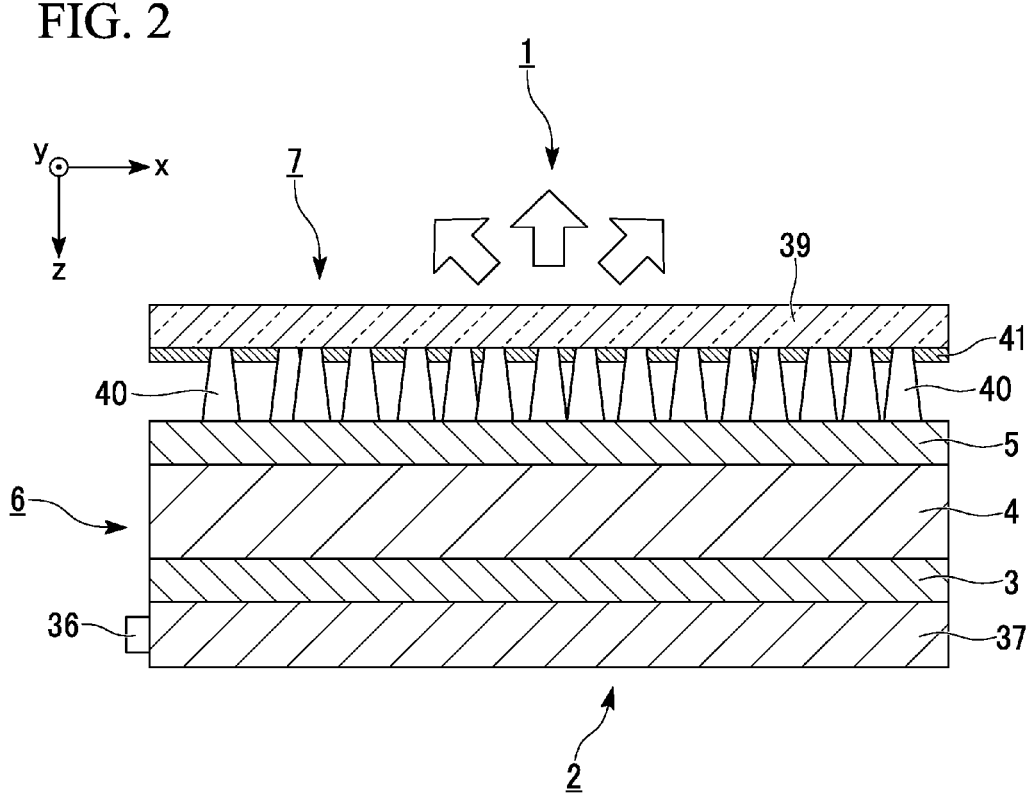
FIG. 2 is a cross-sectional view illustrating the liquid crystal display device according to the first embodiment of the invention.

FIG. 1A is a perspective view illustrating a liquid crystal display device according to the present embodiment when looked inclinedly from above the liquid crystal display device (visible side). FIG. 1B is a perspective view illustrating the liquid crystal display device according to the present embodiment when looked inclinedly from below the liquid crystal display device (rear side). FIG. 2 is a longitudinal sectional view illustrating the liquid crystal display device according to the present embodiment.

A liquid crystal display device 1 (display device) of the present embodiment includes a liquid crystal display 6 (display) that includes a backlight 2 (light source), a first polarizing plate 3, a liquid crystal panel 4, and a second polarizing plate 5; and a view angle enlarging film 7 (view angle enlarging member and light-diffusion member), as shown in FIGS. 1A, 1B and FIG. 2. In FIG. 1A and FIG. 2, the liquid crystal panel 4 is schematically shown in the form of a single plate, and a detailed structure thereof will be described later. An observer views a displayed image from an upper side of the liquid crystal display device 1 in FIG. 2 in which the view angle enlarging film 7 is arranged. Accordingly, in the following description, a side where the view angle enlarging film 7 is arranged is referred to as a visible side, and a side where the backlight 2 is arranged is referred to as a rear side.

In the liquid crystal display device 1 of the present embodiment, light emitted from the backlight 2 is modulated in the liquid crystal panel 4, and a predetermined image, characters, or the like is displayed by the modulated light. Further, if the light emitted from the liquid crystal panel 4 passes through the view angle enlarging film 7, the light exits from the view angle enlarging film 7 in a state where angle distribution of the emitted light becomes wider than before the light is incident onto the view angle enlarging film 7. Thus, the observer may visually recognize the displayed image using the wide view angle.

Hereinafter, a specific configuration of the liquid crystal panel 4 will be described.

Here, a transmissive active matrix liquid crystal panel will be described as an example, but the liquid crystal panel capable of being applied to the invention is not limited to the transmissive active matrix liquid crystal panel. The liquid crystal panel capable of being applied to the embodiment of the invention may be a semi-transmissive (transmissive and reflective) liquid crystal panel or a reflective liquid crystal panel, and may be a simple matrix liquid crystal panel in which each pixel does not have a switching thin film transistor (hereinafter, simply referred to as a TFT).

Figure 3:
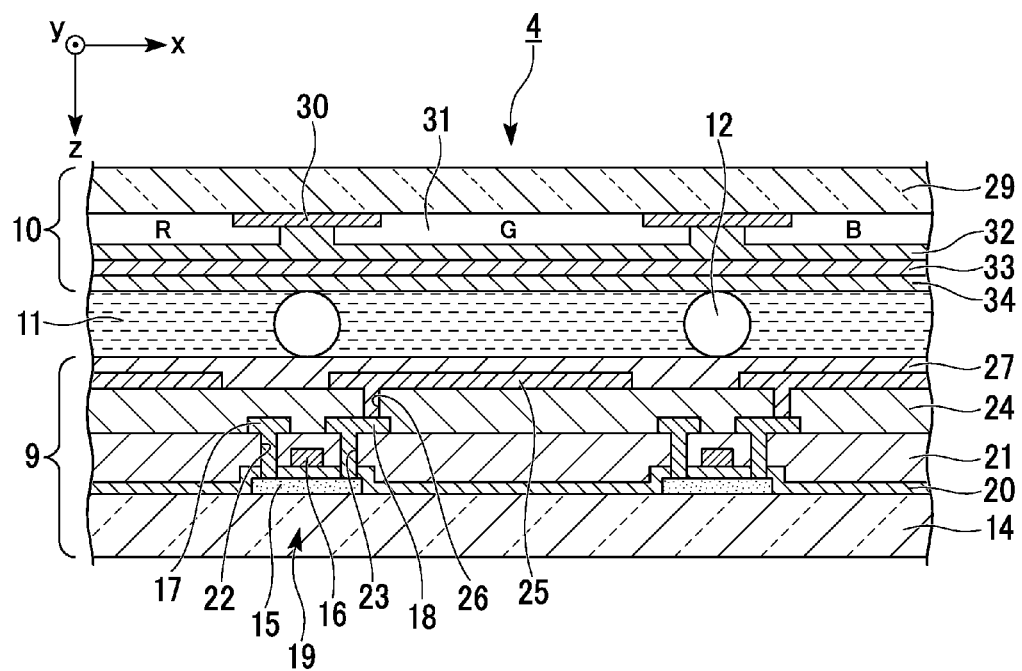
FIG. 3 is a cross-sectional view illustrating a liquid crystal panel in the liquid crystal display device according to the first embodiment of the invention.

FIG. 3 is a longitudinal sectional view of the liquid crystal panel 4.

The liquid crystal panel 4 includes a TFT substrate 9 that is a switching element substrate, a color filter substrate 10 that is arranged to face the TFT substrate 9, and a liquid crystal layer 11 that is interposed between the TFT substrate 9 and the color filter substrate 10, as shown in FIG. 3. The liquid crystal layer 11 is sealed in a space surrounded by the TFT substrate 9, the color filter substrate 10, and a frame-shaped sealing member (not shown) that bonds the TFT substrate 9 and the color filter substrate 10 at a predetermined interval. The liquid crystal panel 4 of the present embodiment performs a display in a VA (Vertical Alignment) mode, for example, and a vertical alignment liquid crystal of which dielectric anisotropy is negative is used in the liquid crystal layer 11. Between the TFT substrate 9 and the color filter substrate 10, a spherical spacer 12 for constantly maintaining the interval between the substrates is arranged. The display mode is not limited to the VA mode, and a TN (Twisted Nematic) mode, an STN (Super Twisted Nematic) mode, an IPS (In-Plane Switching) mode or the like may be used.

A plurality of pixels (not shown) that is a minimum unit region for display is arranged in a matrix form over the TFT substrate 9. Over the TFT substrate 9, a plurality of source bus lines (not shown) is formed to extend in parallel. Further, a plurality of gate bus lines (not shown) extends in parallel, and is formed to be perpendicular to the plurality of source bus lines. Accordingly, the plurality of source bus lines and the plurality of gate bus lines are formed in a square block form over the TFT substrate 9, and a rectangular region divided by adjacent source bus lines and adjacent gate bus lines forms one pixel. The source bus line is connected to a source electrode of a TFT, to be described later, and the gate bus line is connected to a gate electrode of the TFT.

On a surface, on the side of the liquid crystal layer 11, of a transparent substrate 14 that forms the TFT substrate 9, a TFT 19 that includes a semiconductor layer 15, a gate electrode 16, a source electrode 17, a drain electrode 18, and the like is formed. A glass substrate may be used as the transparent substrate 14, for example. The semiconductor layer 15 made of, for example, a semiconductor material such as CGS (Continuous Grain Silicon), LPS (Low-temperature Poly-Silicon), α-Si (Amorphous Silicon), or the like is formed over the transparent substrate 14. Further, a gate insulating film 20 is formed over the transparent substrate 14 to cover the semiconductor layer 15. As a material of the gate insulating film 20, a silicon oxide film, a silicon nitride film, or a layered film of the silicon oxide film and the silicon nitride film may be used, for example. The gate electrode 16 is formed over the gate insulating film 20 to face the semiconductor layer 15. As a material of the gate electrode 16, for example, a layered film of W (tungsten) and TaN (tantalum nitride), Mo (molybdenum), Ti (titanium), Al (aluminum), or the like may be used.

A first inter-layer insulating film 21 is formed over the gate insulating film 20 to cover the gate electrode 16. As a material of the first inter-layer insulating film 21, for example, a silicon oxide film, a silicon nitride film, or a layered film of the silicon oxide film and the silicon nitride film may be used. The source electrode 17 and the drain electrode 18 are formed over the first inter-layer insulating film 21. The source electrode 17 is connected to a source region of the semiconductor layer 15 through a contact hole 22 that penetrates the first inter-layer insulating film 21 and the gate insulating film 20. Similarly, the drain electrode 18 is connected to a drain region of the semiconductor layer 15 through a contact hole 23 that penetrates the first inter-layer insulating film 21 and the gate insulating film 20. As a material of the source electrode 17 and the drain electrode 18, the same conductive material as that of the above-described gate electrode 16 may be used. A second inter-layer insulating film 24 is formed over the first inter-layer insulating film 21 to cover the source electrode 17 and the drain electrode 18. As a material of the second inter-layer insulating film 24, the same material as that of the above-described first inter-layer insulating film 21, or an organic insulating material may be used.

A pixel electrode 25 is formed over the second inter-layer insulating film 24. The pixel electrode 25 is connected to the drain electrode 18 through a contact hole 26 that penetrates the second inter-layer insulating film 24. Accordingly, the pixel electrode 25 is connected to the drain region of the semiconductor layer 15 using the drain electrode 18 as a relay electrode. As a material of the pixel electrode 25, for example, a transparent conductive material such as ITO (Indium Tin Oxide) or IZO (Indium Zinc Oxide) may be used. With such a configuration, when a scanning signal is supplied through the gate bus line and the TFT 19 turns on, an image signal supplied to the source electrode 17 through the source bus line is supplied to the pixel electrode 25 through the semiconductor layer 15 and the drain electrode 18. Further, an alignment film 27 is formed on the entire surface of the second inter-layer insulating film 24 to cover the pixel electrode 25. The alignment film 27 regulates so that liquid crystal molecules that form the liquid crystal layer 11 are vertically aligned. As the type of the TFT, a bottom gate TFT shown in FIG. 3 may be used, or a top gate TFT may be used.

On the other hand, on a surface, on the side of the liquid crystal layer 11, of a transparent substrate 29 that forms the color filter substrate 10, a black matrix 30, a color filter 31, a planarizing layer 32, a counter electrode 33, and an alignment film 34 are sequentially formed. The black matrix 30 has a function of blocking light transmission in an inter-pixel region, and is formed of metal such as Cr (chromium) or a multi-layer film of Cr and chromium oxide, or photoresist obtained by dispersing carbon particles in a photosensitive resin. Pigments of respective colors of red (R), green (G) and blue (B) are included in the color filter 31, and at least one color filter 31 of R, G and B is arranged to face one pixel electrode 25 over the TFT substrate 9. The planarizing layer 32 includes an insulating film that covers the black matrix 30 and the color filter 31, and has a function of alleviating and planarizing a step generated by the black matrix 30 and the color filter 31. The counter electrode 33 is formed over the planarizing electrode 32. As a material of the counter electrode 33, the same transparent conductive material as that of the pixel electrode 25 may be used. Further, on the entire surface of the counter electrode 33, the alignment film 34 that makes the liquid crystal molecules vertically aligned. The color filter 31 may have a multicolor configuration of three colors of R, G, and B or more.

As shown in FIG. 2, the backlight 2 includes a light source 36 such as a light emitting diode or a cold cathode tube, and a light guiding plate 37 that outputs light toward the liquid crystal panel 4 using internal reflection of light emitted from the light source 36. The backlight 2 may be an edge light type in which a light source is arranged on an edge surface of a light guiding body, or may be a direct type in which a light source is arranged directly under a light guiding body. It is preferable to use a backlight that controls a light output direction to have directivity, a so-called directional backlight, as the backlight 2 used in the present embodiment. By using the directional backlight that causes light that is collimated or substantially collimated to be incident onto a light-diffusion part of the view angle enlarging film 7 to be described later, it is possible to reduce a blur, and to increase light use efficiency. The directional backlight may be achieved by optimizing the shape, arrangement, or the like of a reflection pattern formed in the light guiding plate 37. Further, the first polarizing plate 3 that functions as a polarizer is provided between the backlight 2 and the liquid crystal panel 4. Further, the second polarizing plate 5 that functions as a detector is provided between the liquid crystal panel 4 and the view angle enlarging film 7.

Hereinafter, the view angle enlarging film 7 will be described in detail.

Figure 4A:
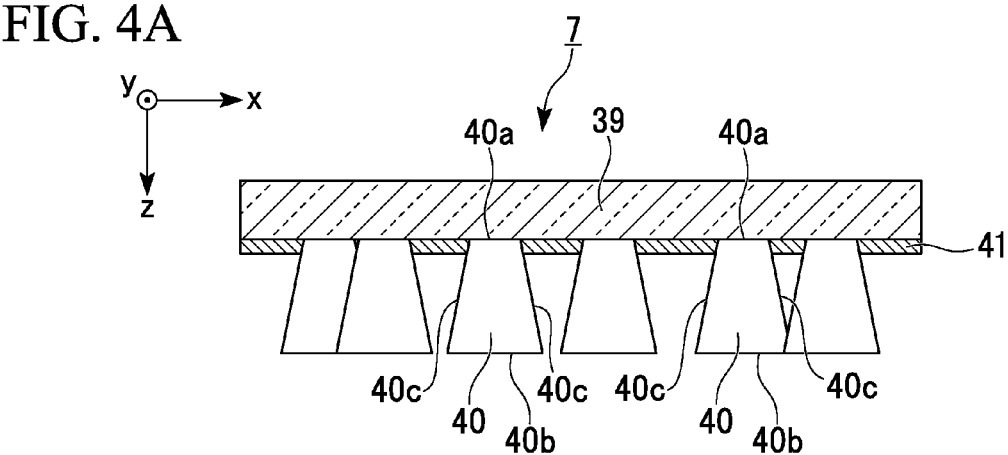
FIG. 4A is a cross-sectional view illustrating a view angle enlarging film in the liquid crystal display device according to the first embodiment of the invention.
Figure 4B:
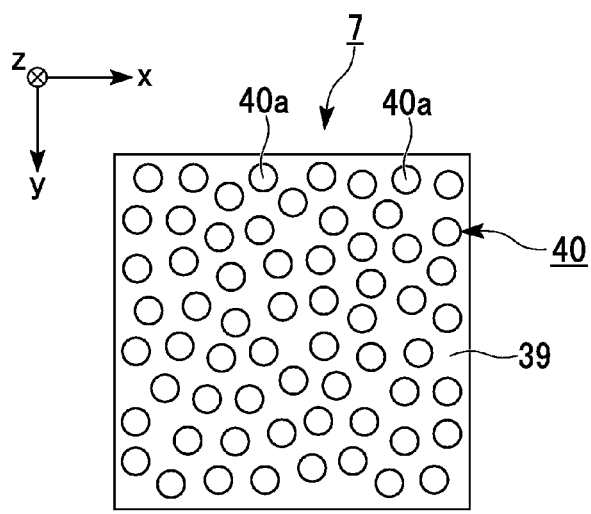
FIG. 4B is a plan view illustrating the view angle enlarging film in the liquid crystal display device according to the first embodiment of the invention.
Figure 4C:
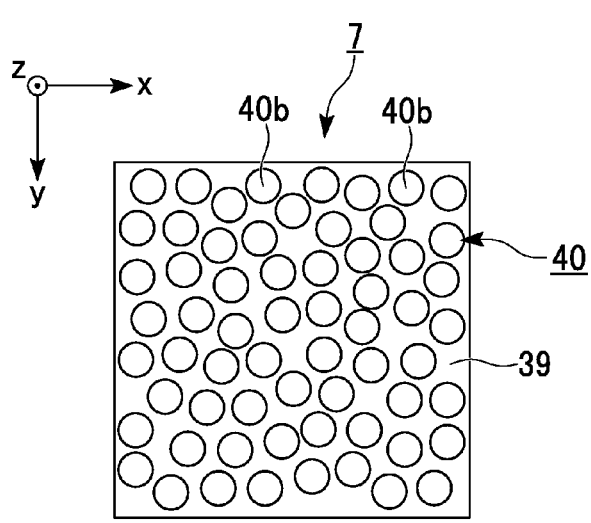
FIG. 4C is a plan view illustrating the view angle enlarging film in the liquid crystal display device according to the first embodiment of the invention.

FIG. 4A is a longitudinal sectional view of the view angle enlarging film 7. FIG. 4B is a plan view of the view angle enlarging film 7 when seen from the visible side. FIG. 4C is a plan view of the view angle enlarging film 7 when seen from the rear side.

As shown in FIG. 4A, the view angle enlarging film 7 includes a substrate 39, a plurality of light-diffusion parts 40 formed on a surface (surface opposite to the visible side) of the substrate 39, and a black layer 41 (light-absorbing layer) formed on the surface of the substrate 39. As shown in FIG. 2, the view angle enlarging film 7 is arranged over the second polarizing plate 5 so that the side on which the light-diffusion parts 40 are provided is directed to the second polarizing plate 5 and the side of the substrate 39 is directed to the visible side.

A substrate made of a transparent resin such as a triacetyl-cellulose (TAC) film, polyethylene-terephthalate (PET), polycarbonate (PC), polyethylene naphthalate (PEN), or a polyether sulfone (PES) film may be preferably used as the substrate 39, for example. The substrate 39 serves as a base when the materials of the black layer 41 and the light-diffusion part 40 are coated later in a forming process to be described later, and should have thermal resistance and mechanical strength in a heat treatment process of the forming process. Thus, a substrate made of glass or the like, instead of the substrate made of resin, may be used as the substrate 39. Here, it is preferable that the thickness of the substrate 39 be thin to such a degree that thermal resistance or mechanical strength is not damaged. This is because as the thickness of the substrate 39 increases, the blur in display may occur. Further, it is preferable that the total light transmittance of the substrate 39 be 90% or higher according to the regulation of JIS J7361-1. If the total light transmittance is 90% or higher, sufficient transparency is obtained. In the present embodiment, a transparent resin substrate having a thickness of 100 μm is used as an example.

The light-diffusion part 40 is formed by an organic material having light transparency and photosensitivity, such as an acrylic resin or an epoxy resin, for example. Further, it is preferable that the total light transmittance of the light-diffusion part 40 be 90% or higher according to the regulation of JIS K7361-1. If the total light transmittance is 90% or higher, sufficient transparency is obtained. As shown in FIGS. 4B and 4C, the light-diffusion part 40 has a circular horizontal section (xy section). Here, the area of a surface 40a on the side of the substrate 39 that corresponds to a light-emission end surface is small, and the area of a surface 40b opposite to the substrate 39 that corresponds to a light-incident end surface is large, in which the area of the horizontal section becomes gradually large as it goes from the side of the substrate 39 toward the side opposite to the substrate 39. That is, the light-diffusion part 40 has a so-called reverse tapered circular truncated cone when seen from the side of the substrate 39.

The light-diffusion part 40 is a portion that contributes to light transmission in the view angle enlarging film 7. That is, the light-incident onto the light-diffusion part 40 is guided in the state of being substantially confined in the light-diffusion part 40 while being totally reflected on a tapered side surface 40c of the light-diffusion part 40, and then exits. As shown in FIGS. 4B and 4C, the plurality of light-diffusion parts 40 is randomly arranged in a normal direction of a main surface of the substrate 39. Here, the x axis is defined as a horizontal direction of a screen of the liquid crystal panel 4, the y axis is defined as a vertical direction of the screen of the liquid crystal panel 4, and the z axis is defined as a thickness direction of the liquid crystal display device 1.

As shown in FIG. 4A, the black layer 41 is formed in a region other than a region where the plurality of light-diffusion parts 40 is formed, among the surface of the substrate 39 where the light-diffusion part 40 is formed. As an example, the black layer 41 is formed of an organic material having light absorbability and photosensitivity such as black resist. Further, a metal film such as Cr (chromium) or a multi layer of Cr and chromium oxide may be used. The thickness of the black layer 41 is set to be smaller than the height of the light-diffusion part 40 from the light-incident end surface 40b to the light-emission end surface 40a. In the case of the present embodiment, the thickness of the black layer 41 is about 150 nm, for example, and the height of the light-diffusion part 40 from the light-incident end surface 40b to the light-emission end surface 40a is about 25 μm, for example. Accordingly, in a gap between the plurality of light-diffusion parts 40, the black layer 41 is present in a portion thereof being in contact with one surface of the substrate 39, and air is present in a portion other that the portion where the black layer 40 exists.

It is preferable that a refractive index of the substrate 39 and a refractive index of the light-diffusion part 40 be approximately the same. This is because if the refractive index of the substrate 39 and the refractive index of the light-diffusion part 40 are noticeably different from each other, when the light-incident from the light-incident end surface 40b is to exit from the light-diffusion part 40, unnecessary light refraction or reflection occurs in an interface between the light-diffusion part 40 and the substrate 39, which may cause a problem that a desired view angle is not obtained and the light intensity of the exiting light is reduced, for example.

As shown in FIG. 2, the view angle enlarging film 7 is arranged so that the substrate 39 is directed to the visible side. Therefore, the surface having the small area among two opposite surfaces of the truncated conical light-diffusion part 40 is the light-emission end surface 40a, and the surface having the large area is the light-incident end surface 40b. Further, an inclination angle of the side surface 40c of the light-diffusion part 40 (angle formed by the light-emission end surface 40a and the side surface 40c) is about 80°, for example. Here, the inclination angle of the side surface 40c of the light-diffusion part 40 is not particularly limited as long as it is an angle capable of sufficiently diffusing the incident light when the light exits from the view angle enlarging film 7.

Figure 5A:
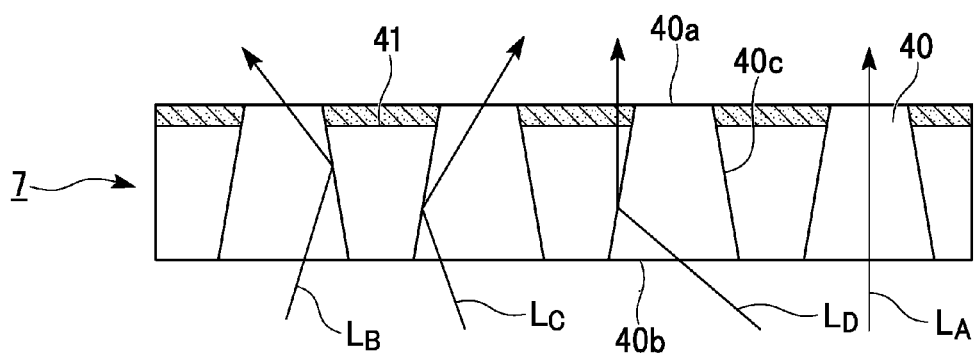
FIG. 5A is a diagram illustrating light reflection on a side surface of a light-diffusion part of the view angle enlarging film in the liquid crystal display device according to the first embodiment of the invention.
Figure 5B:
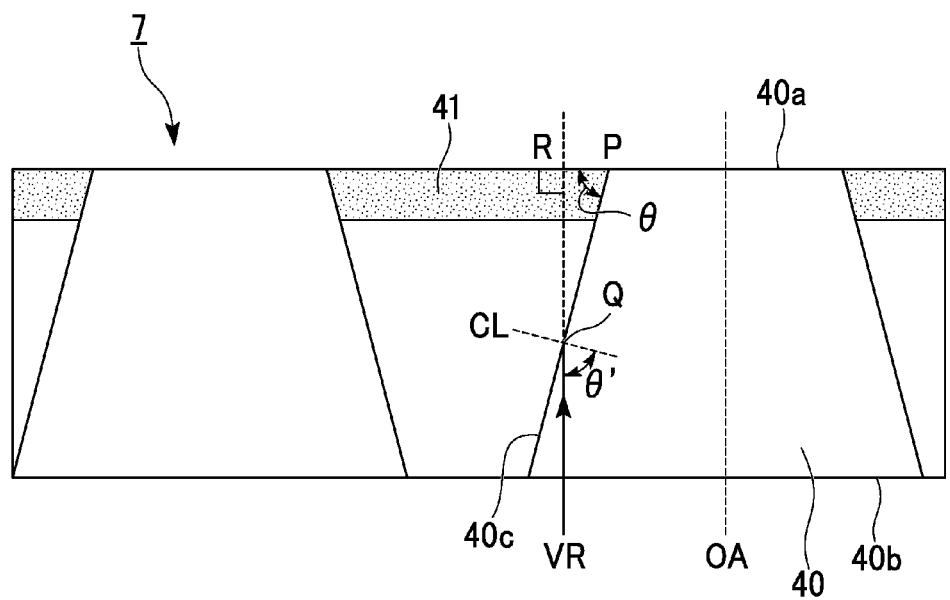
FIG. 5B is a diagram illustrating the light reflection on the side surface of light-diffusion part of the view angle enlarging film in the liquid crystal display device according to the first embodiment of the invention.

As shown in FIG. 5B, the angle formed by the side surface 40c and the light-emission end surface 40a of the light-diffusion part 40 is set to angle θ' (the unit is degree [°]) that exceeds a critical angle with respect to a normal line CL of the side surface 40c of the light-diffusion part 40 so that light-incident in parallel with or approximately in parallel with an optical axis OA is totally reflected. Further, angle θ formed by the side surface 40c of the light-diffusion part 40 and the light-emission end surface 40a perpendicular to the optical axis OA may be expressed as angle QPR where a point at which the side surface 40c of the light-diffusion part 40 intersects with the light-emission end surface 40a is a point P, a point at which an incident light VR parallel with the optical axis OA is incident onto the side surface 40c is a point Q, and an intersection point between a perpendicular line that passes through the point Q, among lines perpendicular to the light-emission end surface 40a, and the light-emission end surface 40a is a point R. Here, since the value of the angle PQR is $(90-\theta)°$, the inclination angle θ of the side surface 40c of the light-diffusion part 40 is the same angle as the incident angle θ' of the incident light VR at the point Q. Accordingly, the inclination angle θ of the side surface 40c of the light-diffusion part 40 is formed as an angle that exceeds the critical angle.

In the case of the present embodiment, since air exists between the adjacent light-diffusion parts 40, if the light-diffusion part 40 is formed of a transparent acrylic resin, for example, the side surface 40c of the light-diffusion part 40 forms an interface between the transparent acrylic resin and air. Here, even though the vicinity of the light-diffusion part 40 is filled with a different material having a low refractive index, a refractive index difference of the interface between the inside and the outside of the light-diffusion part 40 is at a maximum in a case where air is present outside, compared with a case where a certain material having a low refractive index is present outside. According to Snell's law, in the configuration of the present embodiment, the critical angle becomes a minimum, and an incident angle range where light is totally reflected on the side surface 40c of the light-diffusion part 40 becomes a maximum. As a result, it is possible to further suppress light loss, and to achieve high luminance.

As shown in arrows LB and LC in FIG. 5A, an incident light that is incident at an angle that exceeds the critical angle is totally reflected on the side surface 40c, passes through the light-diffusion part 40, and exits toward the observer. Further, as shown in arrow LA in FIG. 5A, an incident light that is not incident onto the side surface 40c and passes through the light-diffusion part 40 exits toward the observer as it is. On the other hand, as shown in arrow LD in FIG. 5A, an incident light that is incident at an angle that is equal to or smaller than the critical angle is not totally reflected, and passes through the side surface 40c of the light-diffusion part 40. In the case of the present embodiment, since the black layer 41 is provided in the region other than the region where the light-diffusion part 40 is formed, the light passed through the side surface 40c of the light-diffusion part 40 is absorbed in the black layer 41. Thus, the blur of display does not occur, and contrast is not reduced. However, if the light passed through the side surface 40c of the light-diffusion part 40 is increased, light intensity loss arises, and thus, it is difficult to obtain a high luminance image. Thus, in the liquid crystal display device 1 of the present embodiment, it is preferable to use a backlight that emits light at such an angle that the light is not incident onto the side surface 40c of the light-diffusion part 40 at an angle that is equal to or smaller than the critical angle, a so-called directional backlight.

Next, a method of forming the liquid crystal display device 1 with such a configuration will be described referring to FIGS. 6 to 10B.

Hereinafter, a process of forming the view angle enlarging film 7 will be mainly described.

First of all, the outline of a forming process of the liquid crystal display 6 will be described. First, the TFT substrate 9 and the color filter substrate 10 are manufactured, respectively. Then, the surface of the TFT substrate 9 where the TFT 19 is formed and the surface of the color filter substrate 10 where the color filter 31 is formed are arranged to face each other. The TFT substrate 9 and the color filter substrate 10 are bonded by a sealing member. Thereafter, liquid crystal is injected into a space surrounded by the TFT substrate 9, the color filter substrate 10, and the sealing member. Further, the first polarizing plate 3 and the second polarizing plate 4 are respectively bonded onto opposite surfaces of the liquid crystal panel 4 obtained in this way, using an optical adhesive or the like. The liquid crystal display 6 is completed through the above-described processes.

Since a known method in the related art is used as the forming method of the TFT substrate 9 and the color filter substrate 10, description thereof will be omitted.

Figure 6:
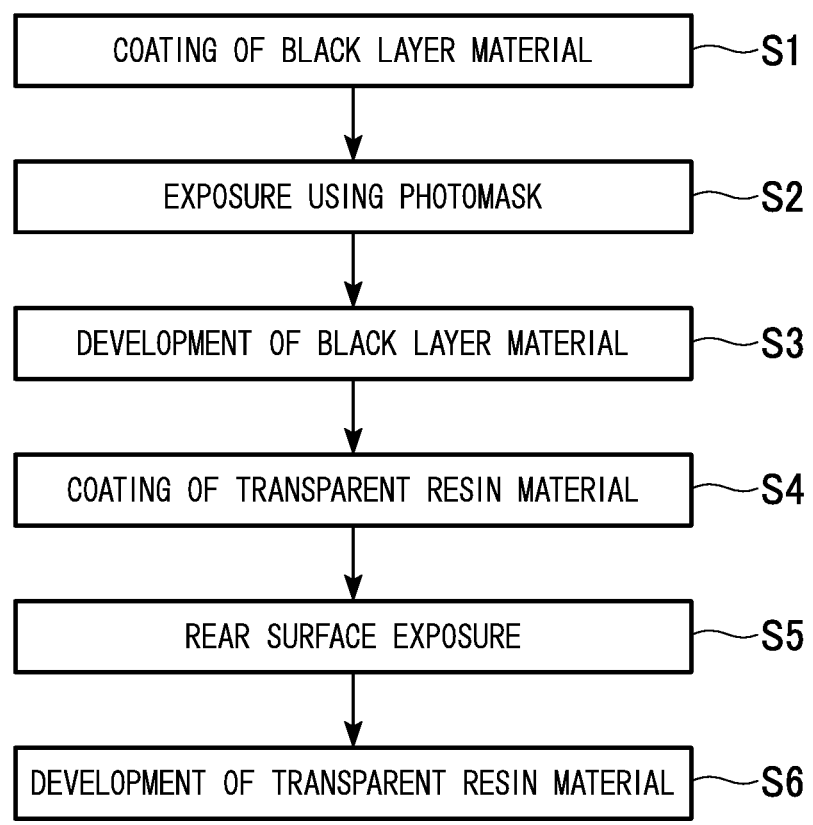
FIG. 6 is a flowchart illustrating a process of forming the view angle enlarging film in the liquid crystal display device according to the first embodiment of the invention.

First, as shown in FIG. 7A, the substrate 39 made of triacetylcellulose with a thickness of 100 μm at a square of 10 cm is prepared, and a black negative resist containing carbon is coated as a black layer material on one surface of the substrate 39 using a spin coating method to form a coating film 44 with a thickness of 150 nm (step S1 in FIG. 6).

Then, the substrate 39 on which the coating film 44 is formed is mounted on a hot plate, and pre-baking of the coating film is performed at a temperature of 90° C. Thus, a solvent in the black negative resist is volatilized.

Thereafter, light is irradiated onto the coating film 44 through a mask 45 in which a plurality of light shielding patterns 47 is randomly arranged using an exposure device, to perform exposure (step S2 in FIG. 6). At this time, the exposure device uses a mixture line of i-line of a wavelength of 365 nm, h-line of a wavelength of 404 nm, and g-line of a wavelength of 436 nm. The exposure is set to 100 mJ/cm². In the case of the present embodiment, since the exposure of the transparent negative resist is performed using the black layer 41 as a mask in the next process to form the light-diffusion part 40, the position of the light shielding pattern 47 of the photomask 45 corresponds to the position where the light-diffusion part 40 is formed. The plurality of light shielding patterns 47 is all circular patterns of a diameter of 20 μm, which are randomly arranged. Thus, the interval (pitch) between the adjacent light shielding patterns 47 is not constant, but an average interval obtained by averaging the intervals between the plurality of light shielding patterns 47 is 25 μm. It is preferable that the average interval of the light shielding patterns 47 be smaller than the interval (pitch) of pixels of the liquid crystal panel 4. Thus, at least one light-diffusion part 40 is formed in the pixel, and thus, it is possible to achieve a wide view angle when being assembled with a liquid crystal panel in which the pitch of pixels used in a mobile device or the like, for example, is small.

Here, an example of a method of designing the photomask 45 in which the plurality of light shielding patterns 47 is randomly arranged will be described.

First, as shown in FIG. 8A, the entire photomask 45 is divided into m×n (for example, thirty-six) regions 46 having a longitudinal number of m (for example, six) and a transverse number of n (for example, six).

Then, as shown in FIG. 8B, in one region 46 divided in the previous process, patterns that are arranged to fill circles corresponding to the shapes of the light shielding patterns 47 at the closest density are created (figure on the left side in FIG. 8B). Next, fluctuation is given to position data that is a reference of the position of each circle such as central coordinates of each circle, for example, using a random function, to thereby create a plurality of types (for example, three types of patterns A, B, and C) of position data is formed (three figures on the right side in FIG. 8B).

Next, as shown in FIG. 8C, the plurality of types of position data A, B, and C that are created in the previous process is randomly allocated to the m×n regions. For example, the respective position data A, B, and C are allocated to the respective regions 46 so that position data A, position data B, and position data C randomly appear in the thirty-six regions 46. Accordingly, when the photomask 45 is viewed for each region 46, the arrangement of the light shielding pattern 47 in each region 46 corresponds to at least one pattern of position data A, position data B and position data C, all the light shielding patterns 47 should not necessarily be randomly arranged in all the regions. However, when the entire photomask 45 is viewed, the plurality of light shielding patterns 47 is randomly arranged.

After the exposure is performed using the photomask 45, the coating film 44 made of the black negative resist is developed using an exclusive developing solution, and is dried at 100° C., to thereby form the black layer 41 that includes a plurality of circular opening portions 41a on the surface of the substrate 39, as shown in FIG. 7B (step S3 in FIG. 6). The circular opening portion 41a corresponds to the region where the light-diffusion part 40 is formed in the next process. In the present embodiment, the black layer 41 is formed by a photolithography method using the black negative resist, but if a photomask in which the light shielding patterns 47 of the present embodiment and the light-transmitting part are reversed is used, instead of the above configuration, it is possible to use a positive resist. Further, the black layer 41 may be formed using a deposition method, a printing method or the like.

Next, as shown in FIG. 7C, a transparent negative resist made of an acrylic resin is coated as a material of the light-diffusion part on an upper surface of the black layer 41 using a spin coating method, to form a coating film 48 with a thickness of 25 μm (step S4 in FIG. 6).

Then, the substrate 39 on which the coating film 48 is formed is mounted on a hot plate, and pre-baking of the coating film 48 is performed at a temperature of 95° C. Thus, a solvent in the transparent negative resist is volatilized.

Thereafter, as shown in FIG. 7D, the substrate 39 is turned over, and diffusion light F is irradiated onto the coating film 48 from the side of the substrate 39 using the black layer 41 as a mask, to perform exposure (step S5 in FIG. 5). At this time, an exposure device that uses a mixture line of i-line of a wavelength of 365 nm, h-line of a wavelength of 404 nm, and g-line of a wavelength of 436 nm is used. The exposure is set to 500 mJ/cm$^2$. Further, as means for irradiating parallel light emitted from the exposure device onto the substrate as the diffusion light F, a diffusion plate of a haze of 50 may be arranged on an optical path of the light emitted from the exposure device, for example.

Then, the substrate 39 on which the coating film 48 is formed is mounted on a hot plate, and a post exposure baking (PEB) of the coating film 48 is performed at a temperature of 95° C.

Next, the coating film 48 made of the transparent negative resist is developed using an exclusive developing solution, and is post-baked at 100° C., to thereby form the plurality of light-diffusion parts 40 on the surface of the substrate 39 as shown in FIG. 7E, (step S6 in FIG. 6).

Hereinbefore, the view angle enlarging film 7 of the present embodiment is completed through the processes of steps S1 to S6 in FIG. 6. It is preferable that the total light transmittance of the view angle enlarging film 7 be 90% or higher. If the total light transmittance is equal to 90% or higher, sufficient transparency is obtained, and thus, it is possible to sufficiently achieve optical performance desired in the view angle enlarging film. The total light transmittance is based on the regulation of JIS K7361-1.

A case where the exposure is performed in a state where the substrate 39 is turned over has been described, but the substrate 39 may not be turned over according to forming devices, and any configuration in which the exposure is performed from the side of the substrate 39 may be used.

Figure 9:
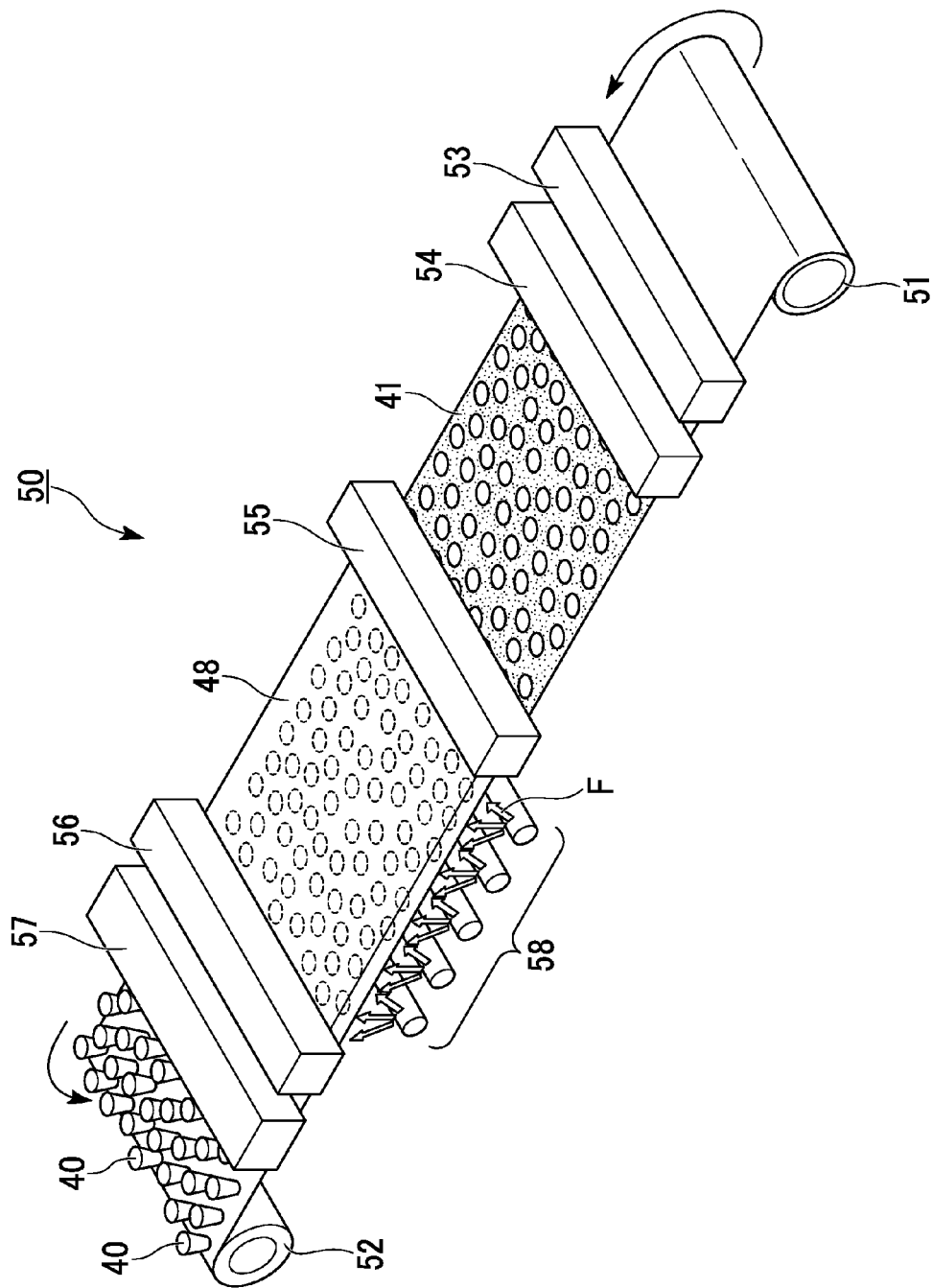
FIG. 9 is a perspective view illustrating an example of an apparatus of forming the view angle enlarging film in the liquid crystal display device according to the first embodiment of the invention.

FIG. 9 is a configuration diagram schematically illustrating an example of a forming device of the view angle enlarging film 7.

A forming device 50 shown in FIG. 9 transports the long substrate 39 from roll to roll to perform various processes between the rolls. Further, the forming device 50 uses a printing method in formation of the black layer 41, instead of the above-described photolithography method that uses the photomask 45.

A feeding roller 51 that feeds the substrate 39 is provided on one end of the forming device 50, and a take-up roller 52 that takes up the substrate 39 is provided on the other end thereof. The substrate 39 moves to the side of the take-up roller 52 from the side of the sending roller 51. A printer 53, a first drier 54, a coater 55, a developer 56, and a second drier 57 are sequentially arranged from the side of the feeding roller 51 to the side of the take-up roller 52 above the substrate 39. An exposure device 58 is arranged below the substrate 39. The printer 53 is provided to print the black layer 41 on the substrate 39. The first drier 54 is provided to dry the black layer 41 formed by printing. The coater 55 is provided to coat a transparent negative resist on the black layer 41. The developer 56 is provided to develop the transparent negative resist after exposure by a developing solution. The second drier 57 is provided to dry the substrate 39 on which the light-diffusion part 40 made of the transparent resist after development is formed. Then, the substrate 39 on which the light-diffusion parts 40 are formed may be bonded with the second polarizing plate 5, and the view angle enlarging film 7 may be integrated with the polarizing plate.

Figure 10A:
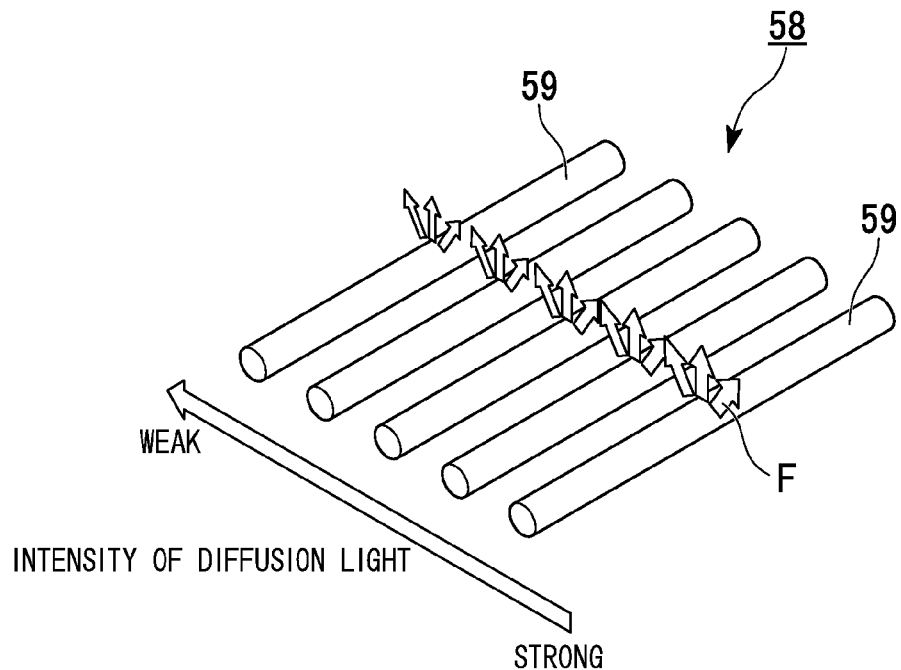
FIG. 10A is a perspective view illustrating main sections of the apparatus according to the first embodiment of the invention.
Figure 10B:
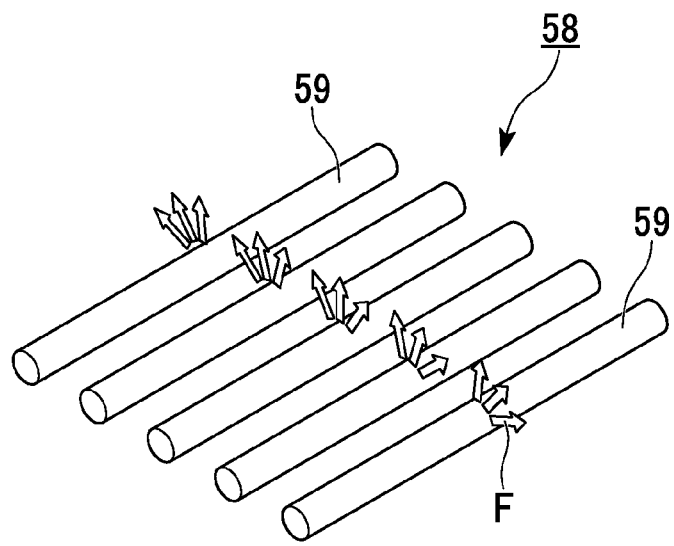
FIG. 10B is a perspective view illustrating the main sections of the apparatus according to the first embodiment of the invention.

The exposure device 58 is provided to perform exposure of the coating film 48 of the transparent negative resist from the side of the substrate 39. FIGS. 10A and 10B are diagrams illustrating only the portion of the exposure device 58 extracted from the forming device 50. As shown in FIG. 10A, the exposure device 58 includes a plurality of light sources 59, in which the intensity of the diffusion light F from each light source 59 may be changed, for example, the intensity of the diffusion light F may be gradually weak according to the progress of the substrate 39. Alternatively, as shown in FIG. 10B, in the exposure device 58, an emission angle of the diffusion light F from each light source 59 may be gradually changed according to the progress of the substrate 39. By using the exposure device 58 with this configuration, it is possible to control the inclination angle of the side surface 40c of the light-diffusion part 40 into a desired angle.

In the above example, a configuration is used in which the liquid resist is coated when the black layer 41 or the light diffusion layer 40 is formed, but a resist in the form of film may be attached to one surface of the substrate 39, instead of this configuration.

Finally, as shown in FIG. 2, the completed view angle enlarging film 7 is attached to the liquid crystal display 6 using an optical adhesive or the like, in a state where the substrate 39 is directed to the visible side and the light-diffusion parts 40 face the second polarizing plate 5.

The liquid crystal display device 1 of the present embodiment is completed by the above processes.

Here, a view angle extension effect in the view angle enlarging film 7 of the present embodiment will be described referring to FIGS. 11A and 11B.

Figure 11A:
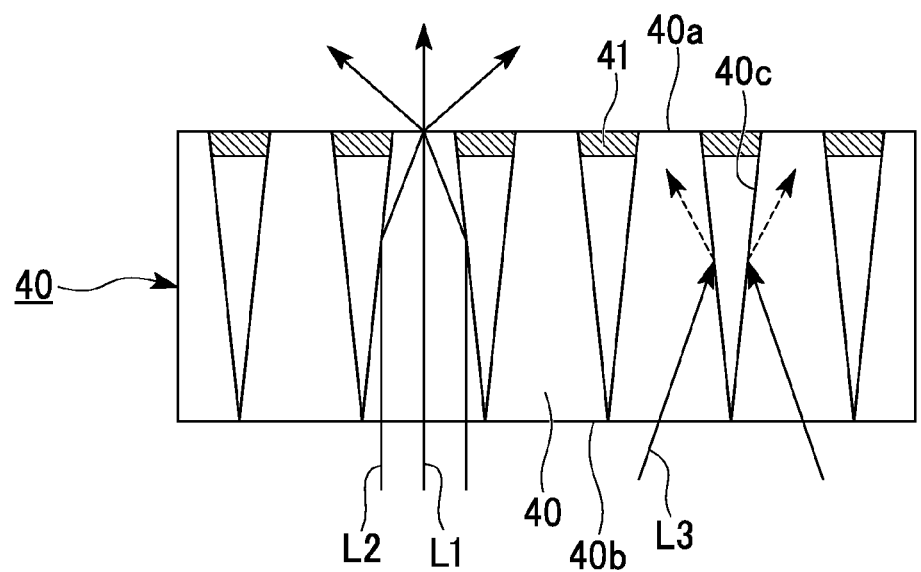
FIG. 11A is a diagram schematically illustrating an operation of the view angle enlarging film according to the first embodiment of the invention.

As shown in FIG. 11A, light L1 that is substantially vertically incident onto the light-incident end surface 40b in the vicinity of the center of the light-diffusion part 40, in light that exits from the liquid crystal display 6 and is incident onto the view angle enlarging film 7, is not totally reflected on the side surface 40c of the light-diffusion part 40, and goes straight and passes through the light-diffusion part 40 as it is. Further, since light L2 that is substantially vertically incident onto the light-incident end surface 40b in the periphery of the light-diffusion part 40 is incident onto the side surface 40c of the light-diffusion part at an incident angle larger than the critical angle, the light is totally reflected on the side surface 40c of the light-diffusion part 40. Then, the totally reflected light is refracted on the light-emission end surface 40a of the light-diffusion part 40, and thus exits in a direction that forms a large angle with respect to the normal direction of the light-emission end surface 40a. On the other hand, since light L3 that is obliquely incident onto the light-incident end surface 40b of the light-diffusion part 40 is incident onto the side surface 40c of the light-diffusion part 40 at an incident angle smaller than the critical angle, the light passes through the side surface 40c of the light-diffusion part 40 and is absorbed in the light-absorbing layer 41.

Figure 11B:
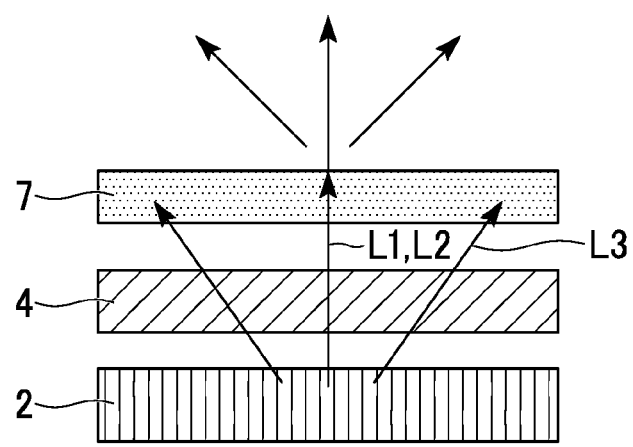
FIG. 11B is a diagram schematically illustrating the operation of the view angle enlarging film according to the first embodiment of the invention.

Through this action, as shown in FIG. 11B, the lights L1 and L2 that are substantially vertically incident onto the view angle enlarging film 7 exit from the view angle enlarging film 7 in a state where the angle distribution is wider than before the lights are incident onto the view angle enlarging film 7. Accordingly, even though the observer tilts his/her line of eyes with respect to the front direction (normal direction) of the liquid crystal display 6, the observer may view a favorable display. Particularly, in the case of the present embodiment, since the planar shape of the light-diffusion part 40 is circular, the angle distribution is widened in every direction around the normal direction of the screen of the liquid crystal display 6. Thus, the observer may view a favorable display in every direction. That is, it is possible to enlarge the view angle of the liquid crystal display 6 using the view angle enlarging film 7. On the other hand, the light L3 that is obliquely incident onto the view angle enlarging film 7 is light that obliquely passes through the liquid crystal panel 4, is light of a retardation different from a desired retardation, and is light that causes a so-called display contrast reduction. The view angle enlarging film 7 of the present embodiment is able to increase display contrast by cutting this light by the light-absorbing layer 41.

Generally, it is known that in a case where regular patterns such as stripes or grating are overlaid, if the cycles of respective patterns are slightly different from each other, interference stripes (moire) are viewed. For example, if a view angle enlarging film in which a plurality of light-diffusion parts is arranged in a matrix form is overlaid with a liquid crystal panel in which a plurality of pixels is arranged in a matrix form, moire may occur between the cycle pattern of the light-diffusion parts of the view angle enlarging film and the cycle pattern of the pixels of the liquid crystal panel, and thus, display quality may deteriorate. On the other hand, according to the liquid crystal display device 1 of the present invention, since the plurality of light-diffusion parts 40 are randomly arranged from a planar view, it is possible to maintain display quality without moire due to interference with the regular arrangement of the pixels of the liquid crystal panel 4.

Further, in the process of forming the light-diffusion parts 40, if light is irradiated through the photomask from the side of the coating film 48 made of the transparent negative resist, it is very difficult to adjust the alignment between the substrate 39 on which the black layers 41 of a fine size are formed and the photomask, which essentially results in deviation. As a result, as shown in FIG. 12B, a gap S is generated between the light-diffusion part 40 and the black layer 41, and thus, contrast may be reduced as light is leaked from the gap S.

Figure 12A:
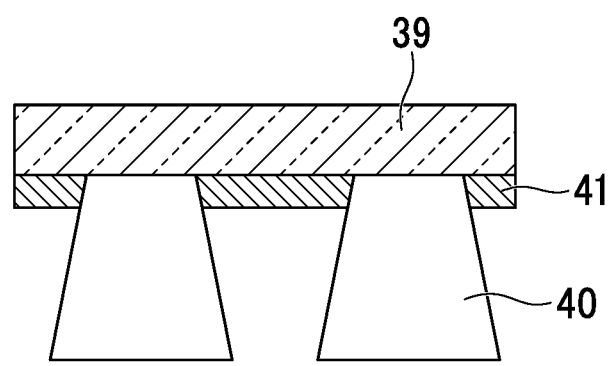
FIG. 12A is a diagram illustrating an effect of the view angle enlarging film according to the first embodiment of the invention.
Figure 12B:
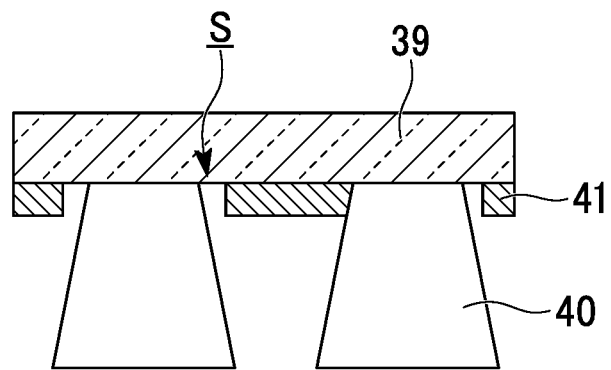
FIG. 12B is a diagram illustrating the effect of the view angle enlarging film according to the first embodiment of the invention.

On the other hand, in the case of the present invention, as shown in FIG. 12A, since light is irradiated from the rear side of the substrate 39 using the black layer 41 as a mask, the light-diffusion part 40 is formed in the state of being in a self alignment at the position of the opening portion 41a of the black layer 41. As a result, the light-diffusion part 40 is in a close contact with the black layer 41, and thus, a gap therebetween is not generated. Thus, it is possible to reliably maintain contrast.

Further, in a case where the black layer 41 is not provided in the substrate 39, external light-incident onto the view angle enlarging film 7 is scattered. If the external light is scattered, visibility in a bright place is reduced. Further, a "misadjusted black level" where a black color seems to be whitish when a black color is displayed occurs, and thus, contrast is reduced, which results in difficulties in appropriate image observation. In order to prevent the problem, the black layer 41 is arranged in the substrate 39.

Second Embodiment

Hereinafter, a second embodiment of the invention will be described referring to FIG. 13 and FIGS. 14A and 14B.

A basic configuration of a liquid crystal display device of the present embodiment is the same as that of the first embodiment, and the shape of a light-diffusion part of a view angle enlarging film is different from that of the first embodiment. Thus, in the present embodiment, description about the basic configuration of the liquid crystal display device will be omitted, and only the view angle enlarging film will be described.

Figure 13:
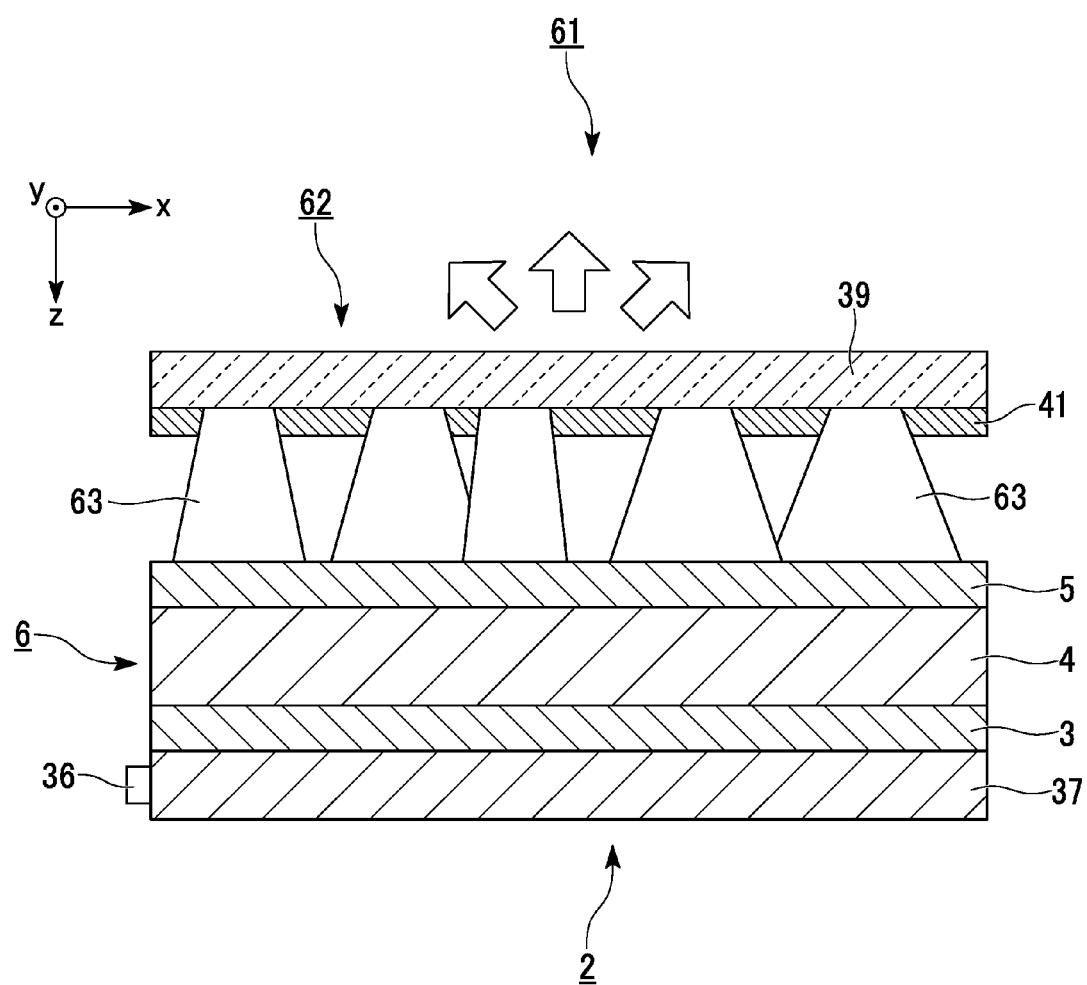
FIG. 13 is a cross-sectional view illustrating a liquid crystal display device according to a second embodiment of the invention.

FIG. 13 is a longitudinal sectional view illustrating the liquid crystal display device of the present embodiment. FIG. 14A is a longitudinal sectional view illustrating the view angle enlarging film of the present embodiment, and FIG. 14B is a plan view illustrating a photomask used in forming the view angle enlarging film.

Figure 14A:
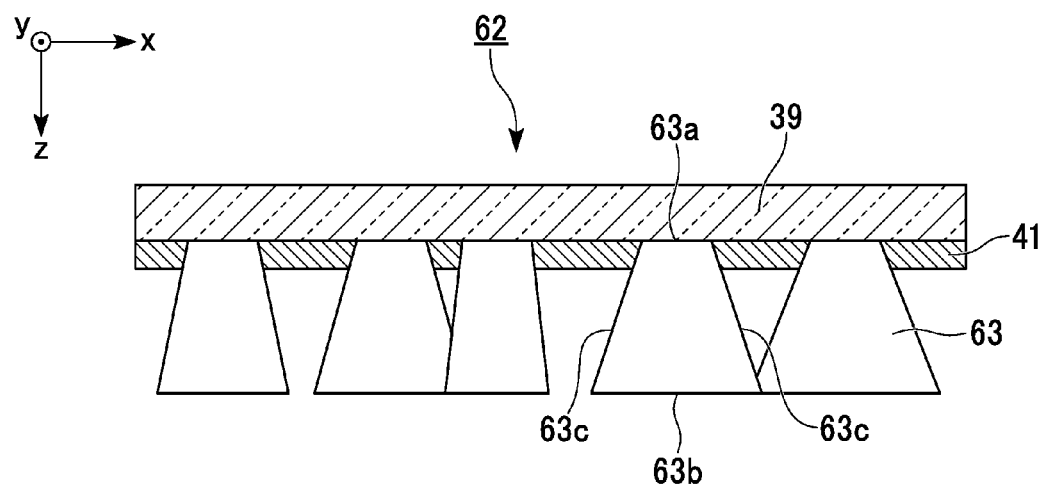
FIG. 14A is a cross-sectional view illustrating a view angle enlarging film in the liquid crystal display device according to the second embodiment of the invention.
Figure 14B:
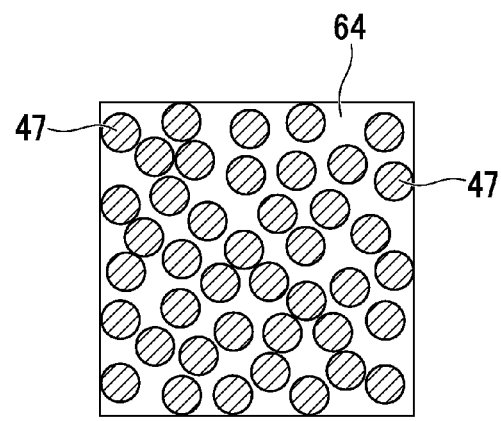
FIG. 14B is a plan view illustrating the view angle enlarging film in the liquid crystal display device according to the second embodiment of the invention.

Further, in FIG. 13 and FIGS. 14A and 14B, the same reference numerals are given to the same components as in the drawings used in the first embodiment, thus detailed description thereof will be omitted.

In the first embodiment, all the plurality of light-diffusion parts 40 has the same shape. On the other hand, in a view angle enlarging film 62 of the present embodiment, as shown in FIG. 13 and FIG. 14A, the sizes of light-emission end surfaces 63a of a plurality of light-diffusion parts 63 are the same, but inclination angles of side surfaces 63c are different. That is, in the plurality of light-diffusion parts 63 as a whole, the side surfaces 63c of the plurality of light-diffusion parts 63 have a plurality of inclination angles. Further, as the inclination angles of the side surfaces 63c of the plurality of light-diffusion parts 63 are different, the sizes of light-incident end surfaces 63b are different.

As shown in FIG. 14B, a photomask 64 used when the black layer 41 is formed has light shielding patterns 47 having all the same size, which is the same as in the first embodiment. After the black layer 41 is formed using the photomask 64, when a transparent negative resist is exposed, by changing a diffusion angle of diffusion light according to locations, it is possible to form the plurality of light-diffusion parts 63 in which the inclination angles of the side surface 63c are different. The other configurations are the same as in the first embodiment.

In the liquid crystal display device 61 of the present embodiment, it is similarly possible to obtain the same effect capable of maintaining display quality without moire, as in the first embodiment.

As described in the first embodiment, the light-incident onto the light-diffusion part is totally reflected on the side surface of the light-diffusion part, and exits from the light-diffusion part in a state where the angle distribution is wider than before incidence. Accordingly, the angle distribution of the light-emission from the light-diffusion part depends on the distribution of the inclination angles of the side surface of the light-diffusion part. Thus, if the inclination angle of the side surface 40c of the light-diffusion part 40 is constant as in the first embodiment, the luminance is increased at a specific light-emission angle, and thus, a bright display may be viewed at a specific observation angle. Contrarily, when the display device is observed at different angles, display non-uniformity may be observed according to observation angles.

On the other hand, according to the configuration of the present embodiment, since the inclination angles of the side surfaces 63c of the plurality of light-diffusion parts 63 are different from each other, it is possible to interpolate and widen the range of the total light reflection angle between the plurality of light-diffusion parts 63 in which the inclination angles of the side surfaces 63c are different. As a result, when the liquid crystal display device 61 is observed at different angles, the luminance is smoothly changed according to the observation angles, to thereby improve view angle characteristics.

In the present embodiment, since the inclination angle of the side surface 63c of the light-diffusion part 63 is set to a plurality of types, the luminance is smoothly changed, which is preferable. Here, even though the inclination angle of at least a part of the light-diffusion parts is different from that of the other light-diffusion parts to set two types of inclination angles, it is possible to improve the view angle characteristics.

Third Embodiment

Hereinafter, a third embodiment of the invention will be described referring to FIG. 15 to FIG. 18C.

A basic configuration of a liquid crystal display device of the present embodiment is the same as that of the first and second embodiments, and the shape of a light-diffusion part of a view angle enlarging film is different from that of the first and second embodiment. Thus, in the present embodiment, description about the basic configuration of the liquid crystal display device will be omitted, and only the view angle enlarging film will be described.

Figure 15:
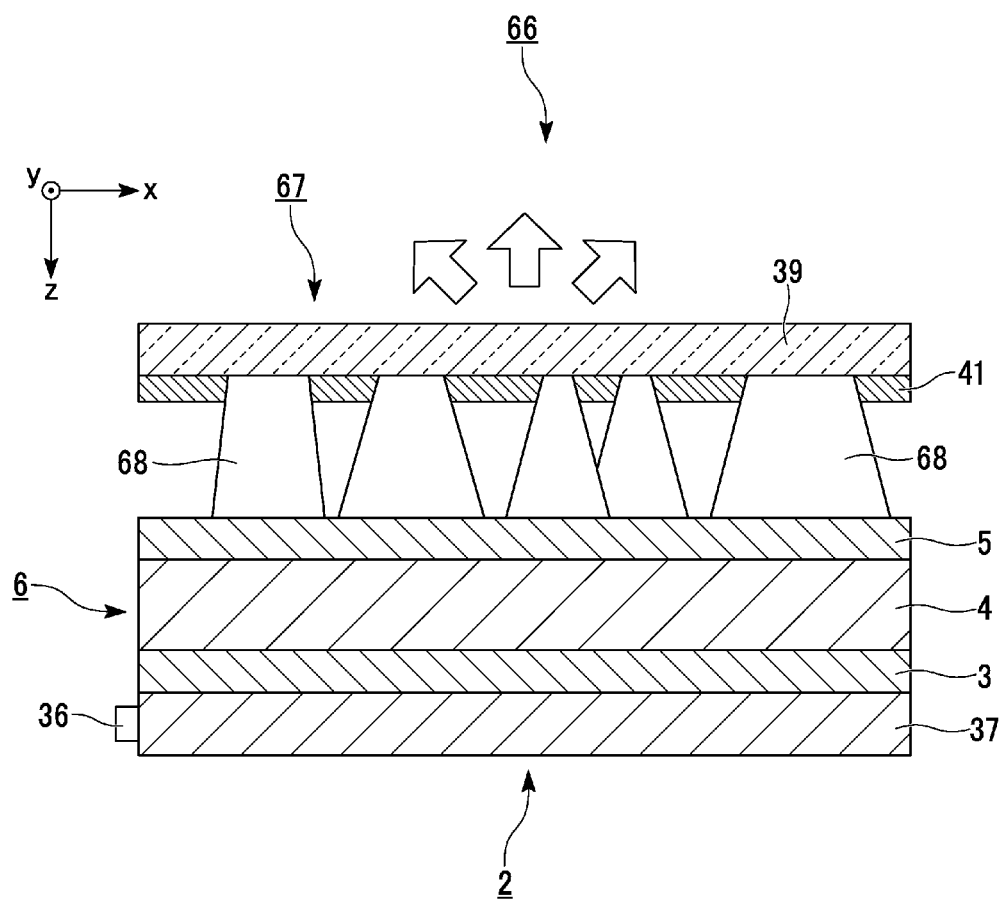
FIG. 15 is a cross-sectional view illustrating a liquid crystal display device according to a third embodiment of the invention.
Figure 16A:
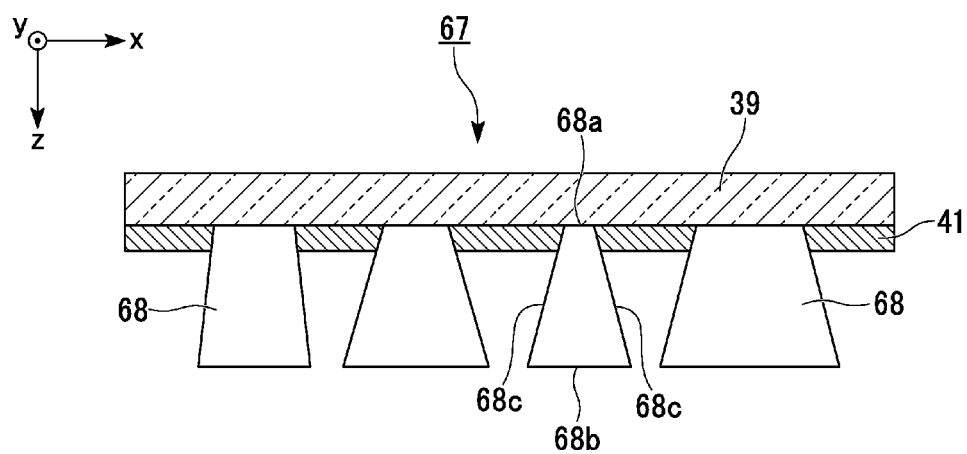
FIG. 16A is a cross-sectional view illustrating a view angle enlarging film in the liquid crystal display device according to the third embodiment of the invention.
Figure 16B:
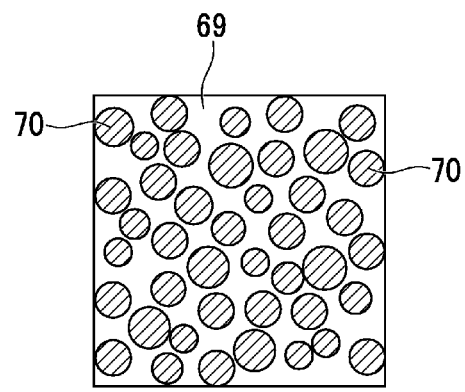
FIG. 16B is a plan view illustrating a photo mask used for forming the view angle enlarging film in the liquid crystal display device according to the third embodiment of the invention.
Figure 17A:
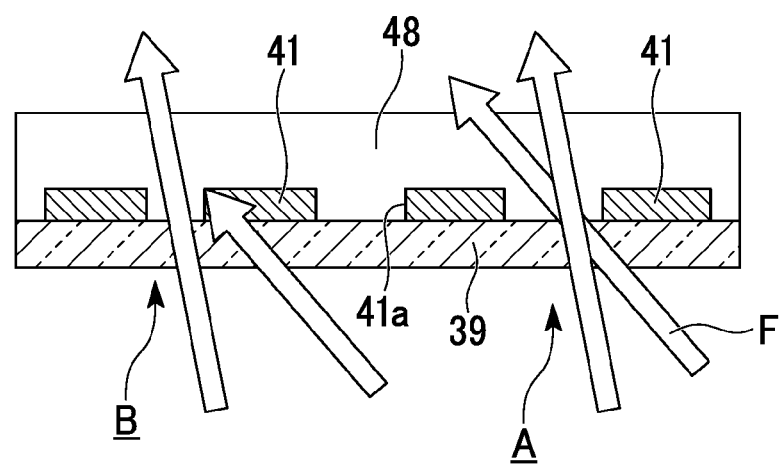
FIG. 17A is a cross-sectional view illustrating an operation of the view angle enlarging film in an exposure process in the liquid crystal display device according to the third embodiment of the invention.
Figure 17B:
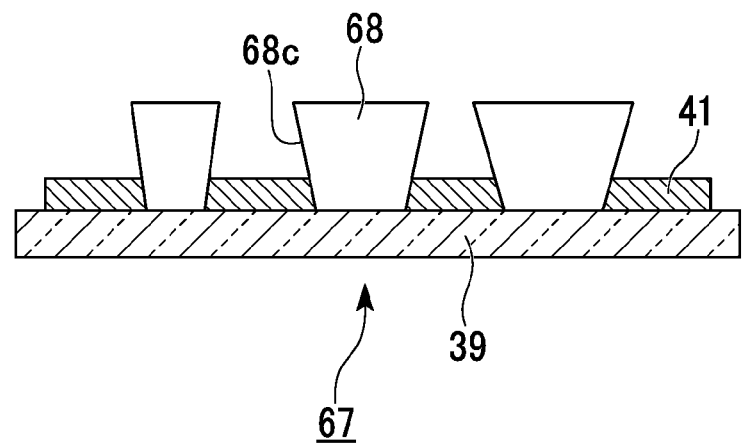
FIG. 17B is a cross-sectional view illustrating the operation of the view angle enlarging film in the exposure process in the liquid crystal display device according to the third embodiment of the invention.
Figure 18A:
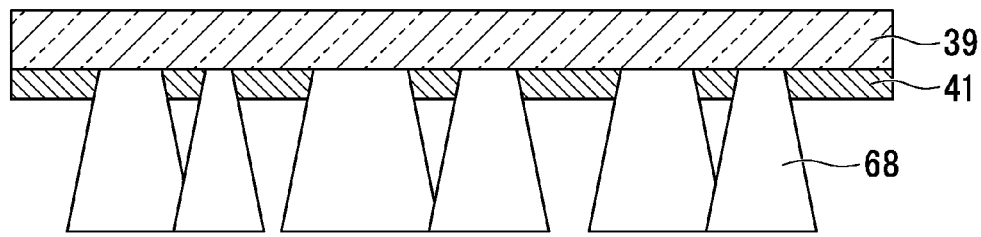
FIG. 18A is a cross-sectional view illustrating a view angle enlarging film in a liquid crystal display device according to a modified example of the third embodiment of the invention.
Figure 18B:
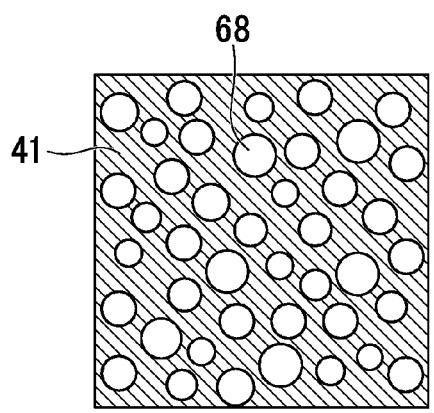
FIG. 18B is a plan view illustrating the view angle enlarging film in the liquid crystal display device according to the modified example of the third embodiment of the invention.
Figure 18C:
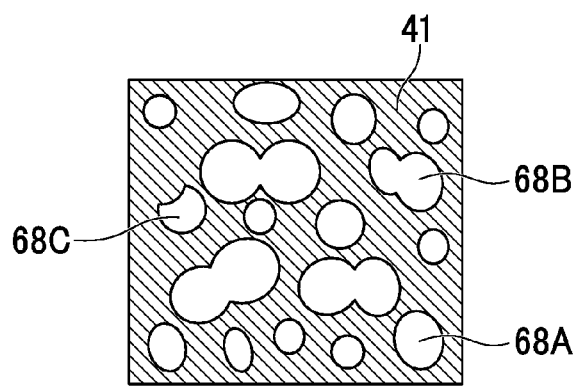
FIG. 18C is a plan view illustrating the view angle enlarging film in the liquid crystal display device according to the modified example of the third embodiment of the invention.

FIG. 15 is a longitudinal sectional view illustrating the liquid crystal display device of the present embodiment. FIG. 16A is a longitudinal sectional view illustrating a view angle enlarging film of the present embodiment, and FIG. 16B is a plan view illustrating a photomask used for forming the view angle enlarging film. FIGS. 17A and 17B are diagrams illustrating a manufacturing method of forming the view angle enlarging film of the present embodiment. FIG. 18A is a cross-sectional view illustrating a view angle enlarging film in a liquid crystal display device according to a modified example of the present embodiment, and FIGS. 18B and 18C are plan views illustrating the view angle enlarging film in the liquid crystal display device according to the modified example of the present embodiment.

Further, in FIG. 15 to FIG. 18C, the same reference numerals are given to the same components as in the drawings used in the first and second embodiments, thus detailed description thereof will be omitted.

In the first embodiment, all the plurality of light-diffusion parts has the same shape. In the second embodiment, in the plurality of light-diffusion parts, the sizes of the light-emission end surfaces are the same, and the inclination angles of the side surfaces are different. On the other hand, in a view angle enlarging film 67 of the present embodiment, as shown in FIG. 15 and FIG. 16A, in a multiple types of light-diffusion parts 68, the sizes (sizes of the opening portions of the black layer 41) of light-emission end surface 68a are different, and inclination angles of side surfaces 68c are also different. That is, in the plurality of light-diffusion parts 68, the light-emission end surfaces 68a of the plurality of light-diffusion parts 68 have a plurality of sizes, and the side surfaces 68c of the plurality of light-diffusion parts 68 have a plurality of inclination angles. Further, as the inclination angles of the side surfaces 68c are different in the plurality of light-diffusion parts 68, the sizes of the light-incident end surfaces 68b are different. The other configurations are the same as in the first embodiment.

As shown in FIG. 16B, in a photomask 69 used when the black layer 41 is formed, the sizes of a plurality of light shielding patterns 70 are different, and the diameters are distributed in the range of 10 to 25 µm. If the black layer 41 is formed using the photomask 69, the black layer 41 in which the sizes of a plurality of openings are different is obtained. Then, as shown in FIG. 17A, if the exposure of the coating film 48 made of the transparent negative resist is performed from the side of the substrate 39 using the black layer 41 as a mask, in a location where the size of the opening portion 41a of the black layer 41 is large like a location indicated as A in FIG. 17A, light-incident onto the substrate 39 at a large incident angle, among the diffusion light F, is hardly light-shielded by the black layer 41. Thus, since the light-incident onto the substrate 39 at a large incident angle in this location contributes to the exposure of the coating film 48 the inclination angle of the side surface 68c of the light-diffusion part 68 becomes gentle as shown in FIG. 17B.

On the other hand, in a location where the size of the opening portion 41a of the black layer 41 is small like a location indicated as B in FIG. 17A, incident light at a large incident angle is easily light-shielded by the black layer 41. Thus, since the light-incident onto the substrate 39 at a large incident angle in this location cannot contribute to the exposure of the coating film 48, the inclination angle of the side surface 68c of the light-diffusion part 68 becomes steep as shown in FIG. 17B. In this way, by changing the sizes of the opening portions 41a of the black layers 41, it is possible to change the sizes of the light-emission end surfaces 68a of the light-diffusion parts 68, and to change the inclination angles of the side surfaces 68c. The diffusion angle of the diffusion light may be changed according to locations as in the first embodiment.

In the view angle enlarging film 67 of the present embodiment, the sizes of the light-emission end surfaces 68a (sizes of the opening portions of the black layer 41) are different, and the inclination angles of the side surfaces 68c are also different in the plurality of light-diffusion parts 68. However, as a modified example of the present embodiment, as shown in FIGS. 18A and 18B, the sizes of the light-emission end surfaces 68a of the plurality of light-diffusion parts 68 are different from each other, but the inclination angles of the side surfaces 68c may be substantially the same. The light-diffusion parts 68 of the present modified example may be formed by optimizing the exposure angle or material of the light-diffusion parts 68.

Further, in the view angle enlarging film 67 of the present embodiment, the shape of the light-emission end surface 68a of the light-diffusion part 68 is circular. However, as the modified example of the present embodiment, as shown in FIG. 18C, the shape of the light-emission end surface 68a of the light-diffusion part 68 may be polygonal, or may be elliptical as in a light-diffusion part 68A. Further, the light-diffusion part 68 may be configured so that the light-emission end surfaces 68a of adjacent light-diffusion parts 68 are connected to each other as in a light-diffusion part 68B. Further, the light-diffusion part 68 may be configured so that a part thereof is cut as in a light-diffusion part 68C.

In the liquid crystal display device 66 of the present embodiment, the same effect capable of maintaining display quality without moire as in the first and second embodiments is similarly obtained. Further, the same effect capable of smoothly changing the luminance according to the observation angles to improve view angle characteristics is obtained as in the second embodiment.

Further, in a case where a plurality of light-diffusion parts is randomly arranged, if the light-diffusion parts having the same size are arranged, interference occurs between the light-diffusion parts, and thus, in many locations, the arrangement of the light-diffusion parts is difficult. In this case, since the ratio of the light-diffusion parts in the entire view angle enlarging film is decreased, the ratio of light that does not pass through the light-diffusion parts and is absorbed into a black layer, among light emitted from a backlight, is increased. As a result, use efficiency of the light from the backlight is reduced, and thus, the front surface luminance is also reduced. In this regard, in the case of the present embodiment, for example, by filling a gap between large light-diffusion parts 68 with a small light-diffusion part 68, it is possible to increase the ratio of the light-diffusion parts 68 in the entire view angle enlarging film 67. Thus, it is possible to improve an efficiency of light utilization of the backlight, and to increase the front surface luminance.

Fourth Embodiment

Hereinafter, a fourth embodiment of the invention will be described referring to FIGS. 19 and 20.

A basic configuration of a liquid crystal display device of the present embodiment is the same as that of the first embodiment, and the shape of a light-diffusion part of a view angle enlarging film is different from that of the first embodiment. Thus, in the present embodiment, description about the basic configuration of the liquid crystal display device will be omitted, and only the view angle enlarging film will be described.

Figure 19:
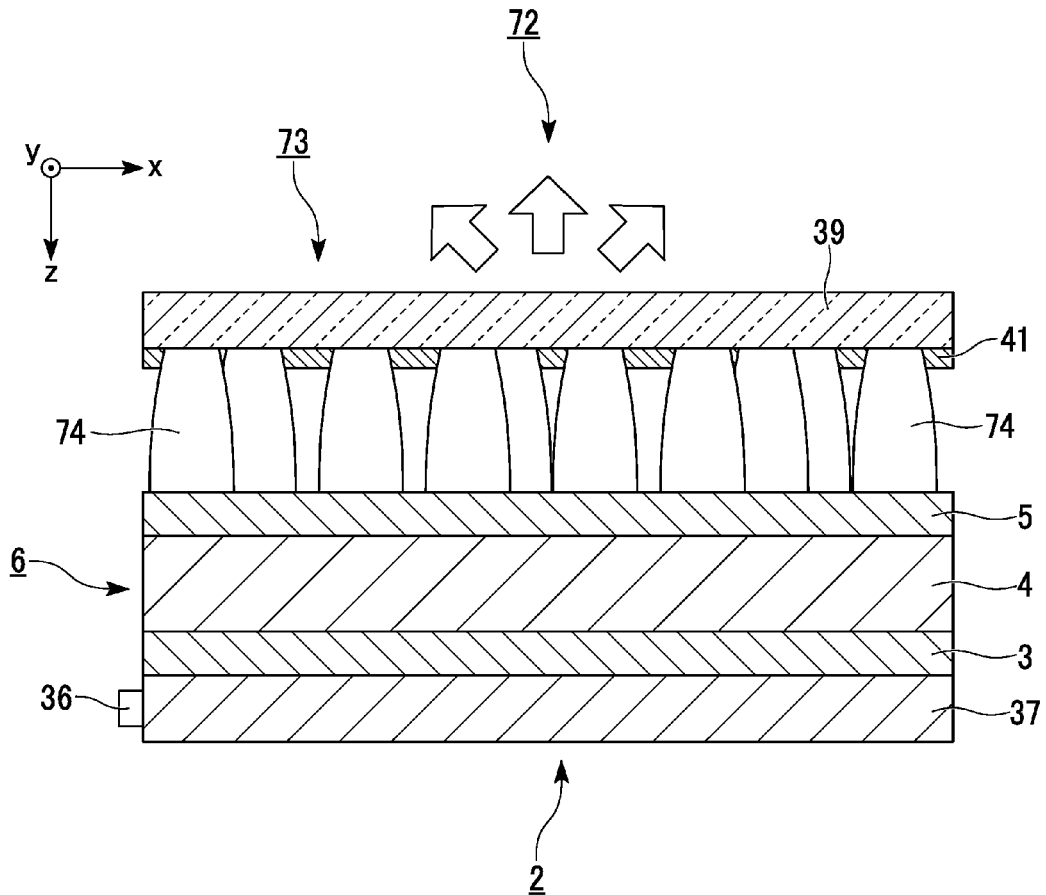
FIG. 19 is a cross-sectional view illustrating a liquid crystal display device according to a fourth embodiment of the invention.

FIG. 19 is a longitudinal sectional view illustrating the liquid crystal display device according to the present embodiment. FIG. 20 is a longitudinal sectional view illustrating the view angle enlarging film of the present embodiment.

Figure 20:
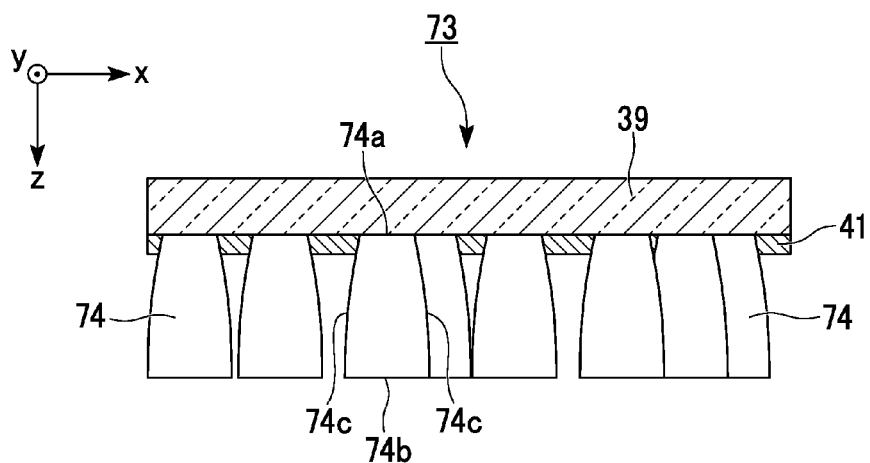
FIG. 20 is a cross-sectional view illustrating a view angle enlarging film in the liquid crystal display device according to the fourth embodiment of the invention.

In FIGS. 19 and 20, the same reference numerals are given to the same components as in the drawings used in the first embodiment, thus detailed description thereof will be omitted.

In the first to third embodiments, the side surface of the light-diffusion part has a constant inclination angle, with respect to one light-diffusion part. On the other hand, as shown in FIGS. 19 and 20, in a view angle enlarging film 73 of the present embodiment, a side surface 74c of each light-diffusion part 74 is smoothly curved in a convex form from a light-emission end surface 74a to a light-incident end surface 74b, and an inclination angle is changed according to locations. That is, the inclination angle of the side surface 74c of each light-diffusion part 74 is continuously changed from the light-emission end surface 74a to the light-incident end surface 74b. The other configurations are the same as in the first embodiment.

In a liquid crystal display device 72 of the present embodiment, the same effect capable of maintaining display quality without moire as in the first to third embodiments is similarly obtained.

Further, in a case where the inclination angle of the side surface of the light-diffusion part is constant, when an observation angle is changed along a horizontal direction or a vertical direction of a screen, display nonuniformity may occur according to observation angles. In order to prevent the display nonuniformity, in the second and third embodiments, the side surfaces have the plurality of inclination angles in the plurality of light-diffusion parts as a whole. On the other hand, in the view angle enlarging film 73 of the present embodiment, in each optical diffusing section 74, since the inclination angle is changed according to the locations of the side surface 74c, the distribution of light reflection angles is widened compared with a case where the inclination angle of the side surface is constant. Thus, the luminance is smoothly changed according to the observation angles, and thus, it is possible to improve view angle characteristics.

Fifth Embodiment

Hereinafter, a fifth embodiment of the invention will be described referring to FIGS. 21 and 22.

A basic configuration of a liquid crystal display device of the present embodiment is the same as that of the first embodiment, and the shape of a light-diffusion part of a view angle enlarging film is the same as that of the first embodiment. Thus, in the present embodiment, description about the basic configuration of the liquid crystal display device will be omitted, and only the view angle enlarging film will be described.

Figure 21:
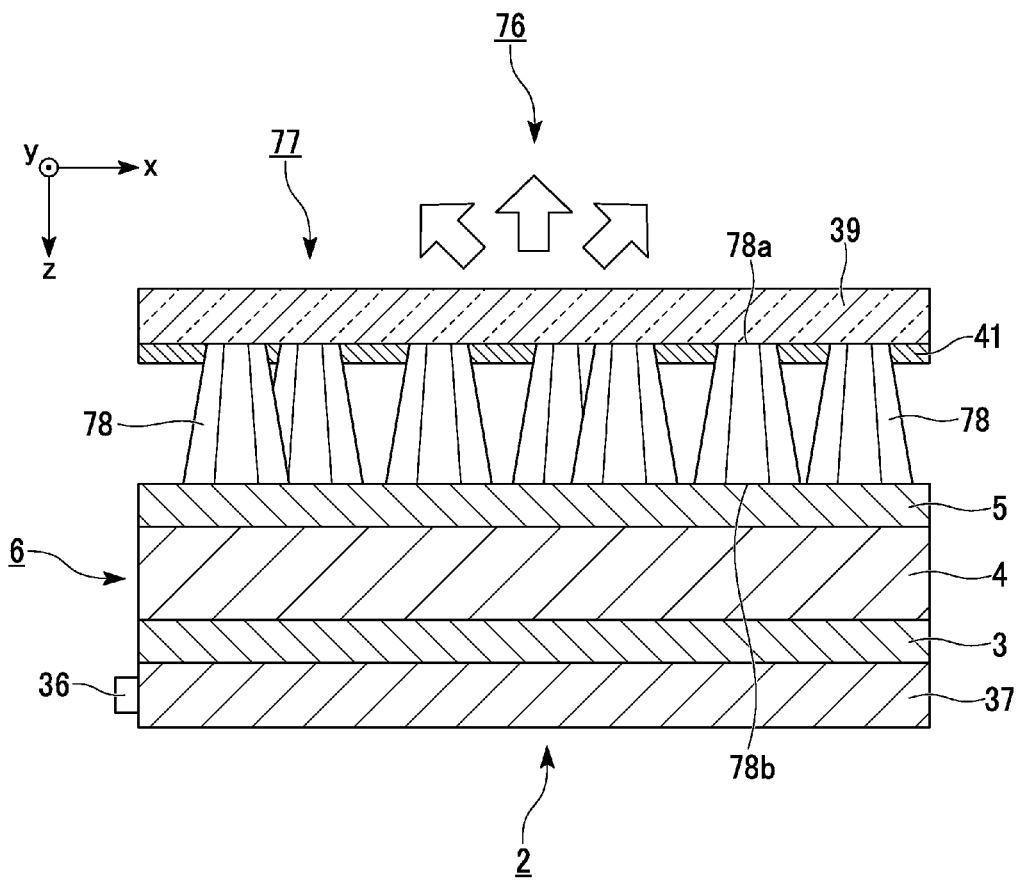
FIG. 21 is a cross-sectional view illustrating a liquid crystal display device according to a fifth embodiment of the invention.

FIG. 21 is a longitudinal sectional view illustrating the liquid crystal display device according to the present embodiment. FIG. 22 is a plan view illustrating the view angle enlarging film of the present embodiment.

Figure 22:
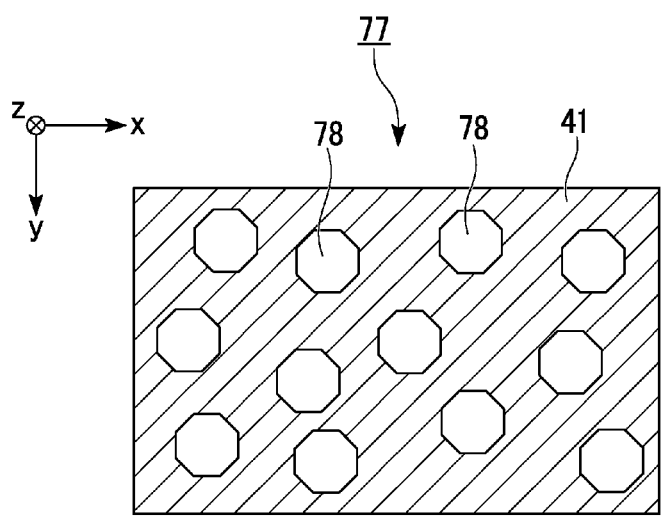
FIG. 22 is a plan view illustrating a view angle enlarging film in the liquid crystal display device according to the fifth embodiment of the invention.

In FIGS. 21 and 22, the same reference numerals are given to the same components as in the drawings used in the first embodiment, thus detailed description thereof will be omitted.

In the first to fourth embodiments, each light-diffusion part has a circular truncated cone shape, and the planar shapes of the light-incident end surface and the light-emission end surface are circular. On the other hand, in a view angle enlarging film 77 of the present embodiment, as shown in FIG. 21, each light-diffusion part 78 has a truncated octagonal pyramid shape, both the planar shapes of a light-incident end surface 78b and a light-emission end surface 78a are octagonal. Among eight sides of the octagon that is the planar shape of each light-diffusion part 78, four sets of sides in which parallel two sides form one set are respectively arranged to be directed in a direction parallel with the x axis, in a direction parallel with the y axis, in a direction that forms an angle of 45° with respect to the x axis (an angle in a counter clockwise direction referring to a forward direction of the x axis), and in a direction that forms an angle of 135° with respect to the x axis. The other configurations are the same as in the first embodiment. When the view angle enlarging film 77 with such a configuration is formed, in the process of forming the black layer 41, a photomask that has an octagonal light shielding pattern may be used.

In a liquid crystal display device 76 of the present embodiment, the same effect capable of maintaining display quality without moire as in the first to fourth embodiments is obtained.

Further, according to the first to fourth embodiments, since the planar shape of the light-diffusion part is circular, light is diffused in every direction around the normal direction of the liquid crystal display 6, and the view angle enlarging effect is achieved in every direction. On the other hand, according to the present embodiment, since the planar shape of the light-diffusion part 78 is octagonal and the above-described four sets of sides are respectively directed in the direction parallel with the x axis, in the direction parallel with the y axis, in the direction that forms the angle of 45° with respect to the x axis, and in the direction that forms the angle of 135° with respect to the x axis, light is collectively diffused in four directions. Thus, the view angle enlarging effect is achieved in the horizontal direction, the vertical direction and the inclined direction of the screen in which the view angle characteristics are particularly important in the liquid crystal display device. The planar shape of the light-diffusion part 78 is not limited to the octagon, and other polygons may be used. In this case, since light is collectively diffused in specific directions according to the shape of the polygon and arrangement of sides, it is possible to provide a liquid crystal display device showing an excellent view angle enlarging effect in specific observation directions.

Sixth Embodiment

Hereinafter, a sixth embodiment of the invention will be described referring to FIGS. 23 to 25.

A basic configuration of a liquid crystal display device of the present embodiment is the same as that of the first embodiment, and only the shape of a light diffusing section of a view angle enlarging film is different from that of the first embodiment. Thus, in the present embodiment, description about the basic configuration of the liquid crystal display device will be omitted, and only the view angle enlarging film will be described.

Figure 23:
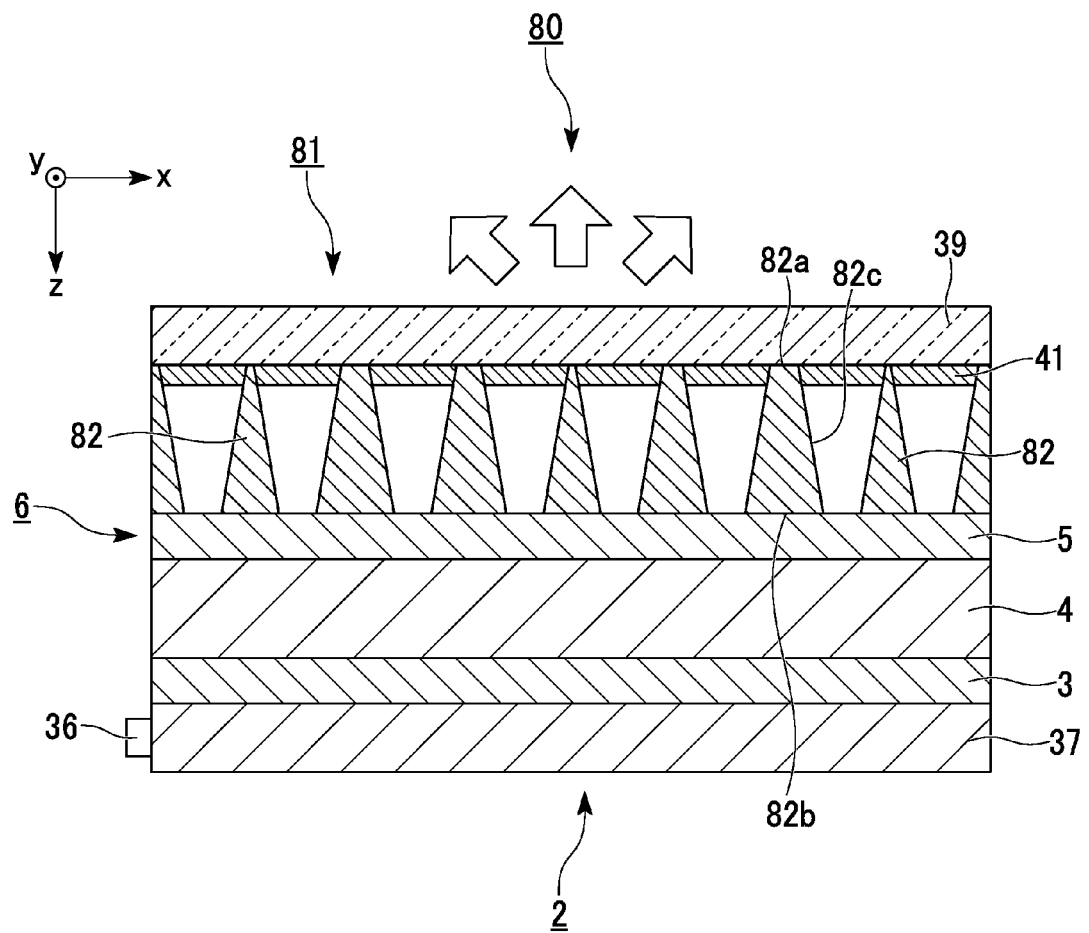
FIG. 23 is a cross-sectional view illustrating a liquid crystal display device according to a sixth embodiment of the invention.
Figure 24A:
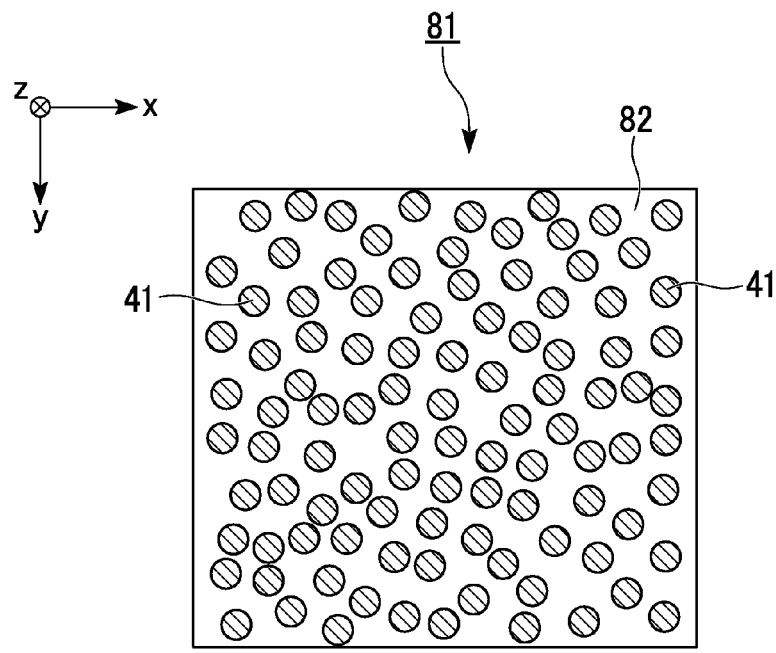
FIG. 24A is a plan view illustrating a view angle enlarging film in the liquid crystal display device according to the sixth embodiment of the invention.
Figure 24B:
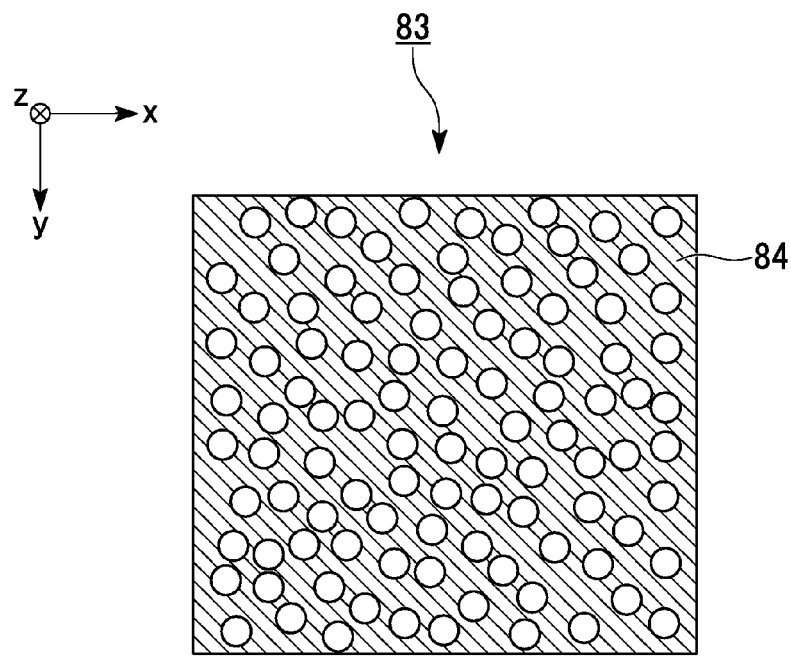
FIG. 24B is a plan view illustrating the view angle enlarging film in the liquid crystal display device according to the sixth embodiment of the invention.

FIG. 23 is a longitudinal sectional view illustrating the liquid crystal display device according to the present embodiment. FIG. 24A is a plan view illustrating a view angle enlarging film according to the present embodiment. FIG. 24B is a plan view illustrating a photomask used for forming a black layer of the view angle enlarging film. FIG. 25 is a plan view illustrating a view angle enlarging film in a liquid crystal display device according to a modified example of the present embodiment.

Figure 25:
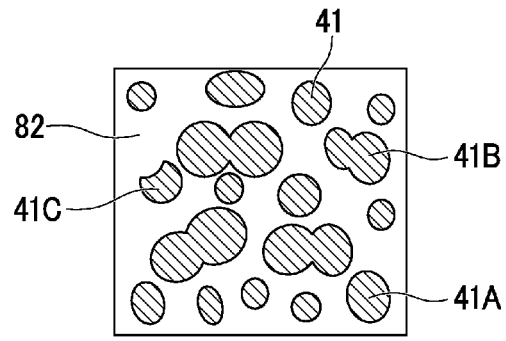
FIG. 25 is a plan view illustrating a view angle enlarging film in a liquid crystal display device according to a modified example of the sixth embodiment of the invention.

Further, in FIGS. 23 to 25, the same reference numerals are given to the same components as in the drawings used in the first embodiment, thus detailed description thereof will be omitted.

As shown in FIGS. 23 and 24A, in a view angle enlarging film 81 of the present embodiment, a region where a light diffusing section 82 is present and a region where the black layer 41 and an air layer are present are reversed compared with the view angle enlarging film of the first embodiment. That is, the view angle enlarging film of the first embodiment has the light-diffusion parts of the circular truncated cone shape, whereas the view angle enlarging film 81 of the present embodiment has the black layer 41 in a portion being in contact with the substrate 39, of a truncated conical space and has the air layer in the other portion. Accordingly, as shown in FIG. 24A, in the black layer 41 of the present embodiment, the plurality of circular black layers 41 is randomly scattered, and the other portion forms an undefined light diffusing section 82. In FIG. 24A, an example is shown in which the black layer 41 has a circular shape, but the shape of the black layer 41 may be elliptical as in a black layer 41A shown in FIG. 25, or may be polygonal. Further, a part of adjacent black layers may be connected to each other as in a black layer 41B. Further, as indicated by a black layer 41C, a part of the black layer may be missing. The shapes and sizes of all the black layers 41 may be substantially the same, or a partial shape or size thereof may be different.

In this way, the shape of the black layer 41 of the present embodiment is obtained by reversing the shape of the black layer of the first embodiment, and as shown in FIG. 24B, a photomask 83 used when the black layer 41 is formed is obtained by reversing the light shielding pattern and the opening portion of the photomask used in the first embodiment, and a portion 84 with hatched lines forms a light shielding pattern. Further, the light-diffusion part 82 of the present embodiment is provided to fill up a portion other than the conical truncated space, and the planar shape of the light-diffusion part 82 is a random undefined form. Here, the present embodiment is the same as the first embodiment in that the light-diffusion part 82 includes a light-emission end surface 82a and a light-incident end surface 82b having an area larger than that of the light-emission end surface 82a and a side surface 82c has a predetermined inclination angle.

In the liquid crystal display device 80 of the present embodiment, it is possible to obtain the same effect capable of maintaining display quality without moire, as in the first to fifth embodiments.

Further, when the black layer 41 is formed, if the size of the opening portion (portion that is the region where the light-diffusion part is formed) is fine, it may be difficult to obtain accurate patterning of the black layers 41. For example, the black negative resist present in the opening portion may not be completely removed. In this regard, in the present embodiment, since the method of remaining the scattered black layers 41 is used, it is possible to easily perform the patterning of the black layers 41 compared with the first embodiment.

Seventh Embodiment

Hereinafter, a seventh embodiment of the invention will be described referring to FIG. 26.

A basic configuration of a liquid crystal display device of the present embodiment is the same as that of the first embodiment, and is different from the first embodiment in that a touch panel is provided. Thus, in the present embodiment, description about the basic configuration of the liquid crystal display device will be omitted, and only a configuration of the touch panel will be described.

Figure 26:
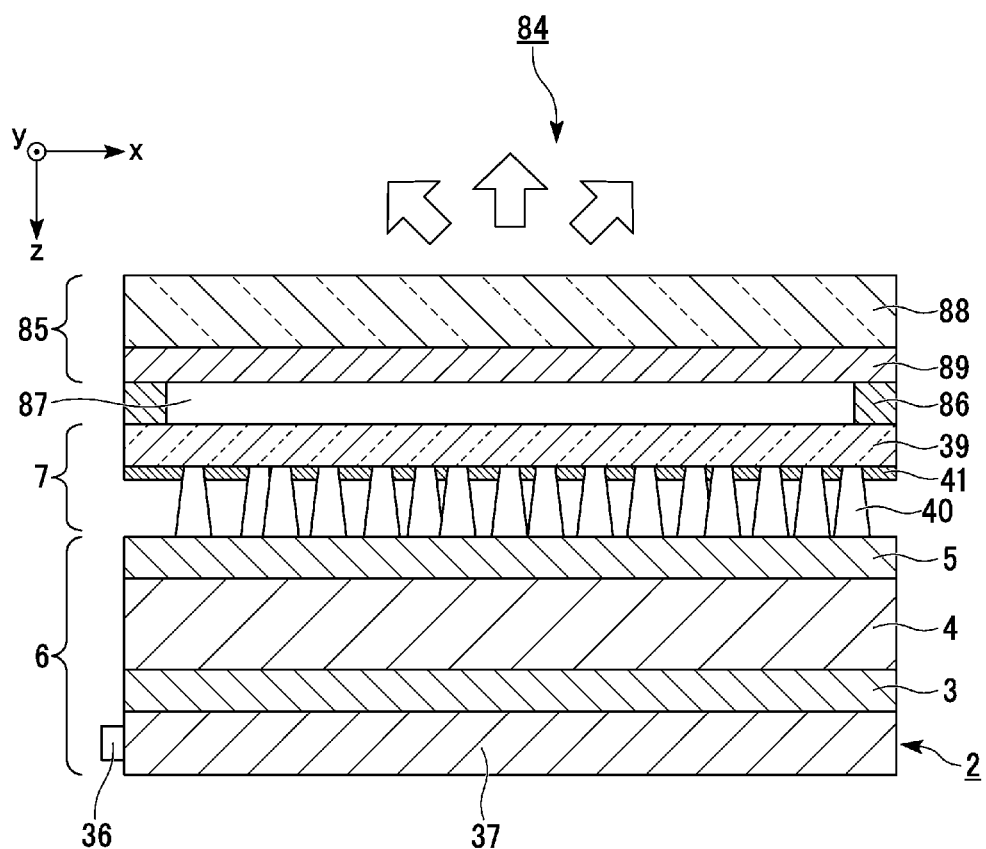
FIG. 26 is a cross-sectional view illustrating a liquid crystal display device according to a seventh embodiment of the invention.

Further, in FIG. 26, the same reference numerals are given to the same components as in FIG. 2 used in the first embodiment, thus detailed description thereof will be omitted.

In a liquid crystal display device 84 of the present embodiment, as shown in FIG. 26, a configuration from the backlight 2 to the view angle enlarging film 7 is the same as in the first embodiment. Further, a touch panel 85 (information input device) is arranged to the visible side of the substrate 39 that forms the view angle enlarging film 7. In the following description, the substrate 39 that forms the view angle enlarging film 7 is referred to as a "view angle enlarging film substrate". The touch panel 85 is attached to the view angle enlarging film substrate 39 by an adhesive material 86 such as a double sided tape in the periphery of the view angle enlarging film substrate 39, and a gap corresponding to the thickness of the adhesive material 86 is formed between the touch panel 85 and the view angle enlarging film substrate 39. That is, an air layer 87 is present between the touch panel 85 and the view angle enlarging film substrate 39.

The touch panel 85 includes a substrate 88 and a position detecting electrode 89. In the following description, the substrate 88 that forms the touch panel 85 is referred to as a "touch panel substrate". The position detecting electrode 89 made of a transparent conductive material such as ITO or ATO (Antimony-doped Tin Oxide) is formed on a surface of the touch panel substrate 88 made of glass or the like. The position detecting electrode 89 is formed by sputtering ITO, ATO or the like, and has a uniform sheet resistance of about several hundreds to 2 kΩ/.

In the present embodiment, the touch panel 85 of a capacitive type is used. In the capacitive touch panel 85, for example, a fine voltage is applied to four corner portions of the position detecting electrode 89 from a planar view of the touch panel 85. If a finger is in contact with an arbitrary position above the position detecting electrode 89, a point where the finger is in contact is grounded through capacitance of a human body. Thus, the voltage in each corner is changed according to resistance values between the ground point and four corners. A position detecting circuit measures this voltage change as an electric current change, and detects the ground point from the measured value, that is, the position where the finger is in contact.

A touch panel capable of being applied to the present embodiment is not limited to the capacitive type, and an arbitrary touch panel such as a resistive film type, an ultrasonic type or an optical type may be applied thereto.

According to the liquid crystal display device 84 of the present embodiment, since the same view angle enlarging film 7 as in the first embodiment is provided, it is possible to achieve a liquid crystal display device having excellent view angle characteristics and an information input function. For example, as a user touches the touch panel 85 with the finger or pen while viewing an image of a wide view angle, it is possible to input information to an information processing device or the like in an interactive manner.

The technical scope according to the aspects of the invention is not limited to the above-described embodiments, and various modifications may be made in a range without departing from the spirit of the aspects of the invention. For example, in the above-described embodiments, the liquid crystal display device is used as the example of the display, but the invention is not limited thereto, and may be applied to an organic electroluminescence display, a plasma display or the like.

Further, in the above-described embodiments, the view angle enlarging film is attached to the second polarizing plate of the liquid crystal display, but the view angle enlarging film and the liquid crystal display should not necessarily be in contact with each other.

For example, a different optical film, optical component or the like may be inserted between the view angle enlarging film and the liquid crystal display. Further, the view angle enlarging film and the liquid crystal display may be disposed at separated positions. In addition, since the polarizing plate is not necessary in the case of the organic electroluminescence display, the plasma display or the like, the view angle enlarging film and the polarizing plate are not in contact with each other.

Further, a configuration may be used in which at least one of an antireflection layer, a polarizing filter layer, an antistatic layer, a non-glare treatment layer, and an antifouling layer is provided on the visible side of the substrate of the view angle enlarging film according to the above-described embodiments. According to this configuration, according to the type of the layer provided on the visible side of the substrate, it is possible to add a function of reducing external light reflection, a function of preventing attachment of dust or dirt, a function of preventing a scratch, or the like, and to prevent deterioration with time of the view angle characteristics.

Further, in the above-described embodiments, the shape of the light-diffusion part is a circular truncated conical shape or a truncated pyramid shape, but the inclination angles of the side surfaces of the light-diffusion part should not be necessarily symmetrical around the optical axis.

In a case where the shape of the light-diffusion part is the circular truncated conical shape or truncated pyramid shape as in the above-described embodiments, since the inclination angles of the side surfaces of the light-diffusion part are symmetrical around the optical axis, a symmetrical angle distribution is obtained around the optical axis. On the other hand, in a case where an unsymmetrical angle distribution is necessary on purpose according to usage of the display device, for example, in a case where the view angle is to be widened only on an upper side or a right side of a screen, the inclination angles of the side surfaces of the light-diffusion part may be unsymmetrical.

Further, specific configurations relating to the arrangements and shapes of the light-diffusion part and the light-absorbing layer, the sizes and materials of the respective parts of the view angle enlarging film, the forming conditions in the forming process thereof, and the like are not limited to the above-described embodiments, and may be appropriately modified.

INDUSTRIAL APPLICABILITY

The aspects of the invention may be used in various display devices such as a liquid crystal display device, an organic electroluminescence display, or a plasma display.

REFERENCE SIGNS LIST 1, 61, 66, 72, 76, 80, 84 LIQUID CRYSTAL DISPLAY DEVICE (DISPLAY DEVICE)
6 LIQUID CRYSTAL DISPLAY (DISPLAY)
7, 62, 67, 73, 77, 81 VIEW ANGLE ENLARGING FILM (VIEW ANGLE ENLARGING MEMBER)
39 SUBSTRATE
40, 63, 68, 74, 78, 82 LIGHT-DIFFUSION PART
40a, 63a, 68a, 74a, 78a, 82a LIGHT-EMISSION END SURFACE
40b, 63b, 68b, 74b, 78b, 82b LIGHT-INCIDENT END SURFACE
40c, 63c, 68c, 74c, 78c, 82c SIDE SURFACE
41 BLACK LAYER (LIGHT-ABSORBING LAYER)
85 TOUCH PANEL (INFORMATION INPUT DEVICE)

The invention claimed is:

1. A light-diffusion member comprising:
   a substrate having light transparency;
   a plurality of light-absorbing layers scattered on one surface of the substrate, the plurality of light-absorbing layers being provided in first regions of the one surface; and
   a plurality of light-diffusion portions provided on second regions of the one surface, the second regions being other than the first regions, wherein
   each of the plurality of light-diffusion portions includes a light-emission end surface and a light-incident end surface, the light-emission end surface being on the one surface, the light-incident end surface being opposite to the light emission end surface, the light-incident end surface including a first area, the light-emission end surface including a second area, the first area being larger than the second area,
   a height from the light-incident end surface to the light-emission end surface is larger than a thickness of each of the plurality of light-absorbing layers,
   the plurality of light-diffusion portions have a random shape when seen, at the one surface, along a normal direction of the one surface, and
   the plurality of light-diffusion portions surround the plurality of light-absorbing layers, and are connected to each other, at the one surface when seen along the normal direction.

2. The light-diffusion member according to claim 1, wherein at least one of an antireflection layer, a polarizing filter layer, an antistatic layer, a non-glare treatment layer, and an antifouling layer is provided above another surface of the substrate, the another surface being opposite to the one surface.

3. The light-diffusion member according to claim 1, wherein an information input device is provided on a visible side of the light-diffusion member.

4. The light-diffusion member according to claim 1, wherein the light-diffusion member comprises a display, the display comprising a light source and a light modulation device, the light modulation device modulating light from the light source, the light having directivity, and the light source emits the light.

5. The light-diffusion member according to claim 1, wherein the light-diffusion member comprises a display body, the display body being a liquid crystal display element.

6. A method of forming a light-diffusion member, the method comprising:

forming a plurality of light-absorbing layers that include at least one opening portion on one surface of a substrate, the substrate having light transparency;

forming a negative photosensitive resin layer having light transparency to cover the plurality of light-absorbing layers on the one surface;

irradiating diffusion light onto the negative photosensitive resin layer through the at least one opening portion, the irradiation being performed from another surface of the substrate, the another surface being opposite to the one surface on which the plurality of light absorbing layers and the negative photosensitive resin layer are formed; and developing the negative photosensitive resin layer irradiated with the diffusion light to form, on the one surface, a plurality of light-diffusion portions, each of the plurality of light-diffusion portions including a light-emission end surface and a light-incident end surface, the light-emission end surface being on the one surface, the light-incident end surface being opposite to the light emission end surface, the light-incident end surface including a first area, the light-emission end surface including a second area, the first area being larger than the second area, wherein the development is performed such that the plurality of light-diffusion portions surround the plurality of light-absorbing layers, and are connected to each other, at the one surface when seen along the normal direction.

* * * * *